(12) United States Patent
Coppola

(10) Patent No.: US 11,733,852 B2
(45) Date of Patent: Aug. 22, 2023

(54) MULTI-LEVEL CONSTRAINED COMMUNICATION SYSTEM

(71) Applicant: Casbu, LLC, Los Angeles, CA (US)

(72) Inventor: Roman F. Coppola, San Francisco, CA (US)

(73) Assignee: Casbu LLC, Los Angeles, CA (US)

( * ) Notice: Subject to any disclaimer, the term of this patent is extended or adjusted under 35 U.S.C. 154(b) by 0 days.

(21) Appl. No.: 17/869,397

(22) Filed: Jul. 20, 2022

(65) Prior Publication Data

US 2023/0127919 A1 Apr. 27, 2023

Related U.S. Application Data

(63) Continuation of application No. 17/128,482, filed on Dec. 21, 2020, now Pat. No. 11,416,135, which is a continuation of application No. 16/239,000, filed on Jan. 3, 2019, now Pat. No. 10,901,595, which is a
(Continued)

(51) Int. Cl.
| | |
|---|---|
| *G06F 3/0482* | (2013.01) |
| *G06F 3/04847* | (2022.01) |
| *H04L 41/0803* | (2022.01) |
| *H04L 43/062* | (2022.01) |
| *H04W 88/02* | (2009.01) |
| *H04L 45/12* | (2022.01) |
| *G06F 16/22* | (2019.01) |
| *G06Q 10/107* | (2023.01) |
| *G06F 3/04883* | (2022.01) |
| *H04L 51/18* | (2022.01) |
| *H04L 51/214* | (2022.01) |
| *H04L 51/04* | (2022.01) |

(52) U.S. Cl.
CPC ........ *G06F 3/04847* (2013.01); *G06F 3/0482* (2013.01); *G06F 3/04883* (2013.01); *G06F 16/22* (2019.01); *G06Q 10/107* (2013.01); *H04L 41/0803* (2013.01); *H04L 43/062* (2013.01); *H04L 45/124* (2013.01); *H04L 51/04* (2013.01); *H04L 51/18* (2013.01); *H04L 51/214* (2022.05); *H04W 88/02* (2013.01)

(58) Field of Classification Search
CPC .......... G06F 21/604; G06F 2221/2141; G06F 3/04847; G06F 3/0482; H04L 63/20
See application file for complete search history.

(56) References Cited

U.S. PATENT DOCUMENTS

| | | |
|---|---|---|
| 6,880,016 B1 | 4/2005 | Van Der Heijden et al. |
| 7,593,993 B2 | 9/2009 | Adams et al. |
| | (Continued) | |

FOREIGN PATENT DOCUMENTS

WO WO 2015/116708 8/2015

*Primary Examiner* — Chirag R Patel
(74) *Attorney, Agent, or Firm* — Van Hoven PC; Joshua Van Hoven

(57) ABSTRACT

A constrained communication system may receive from a first user a plurality of constraints for a first constrained communication. A first constrained communication record is created based on the plurality of constraints. A first communication is generated based on the first constrained communication record. The first communication is provided to a second user. The second user provides response data and the underlying constrained communication is updated based on the response data.

20 Claims, 17 Drawing Sheets

Related U.S. Application Data continuation of application No. 15/287,208, filed on Oct. 6, 2016, now Pat. No. 10,203,862.

(60) Provisional application No. 62/237,979, filed on Oct. 6, 2015.

(56) References Cited

U.S. PATENT DOCUMENTS

| | | | |
|---|---|---|---|
| 8,954,592 B1* | 2/2015 | Cormie | H04L 67/1008 |
| | | | 709/225 |
| 2002/0071436 A1 | 6/2002 | Border et al. | |
| 2004/0186889 A1 | 9/2004 | Washburn | |
| 2006/0026256 A1 | 2/2006 | Diddee et al. | |
| 2006/0034297 A1 | 2/2006 | O'Neill | |
| 2006/0150112 A1* | 7/2006 | Marchev | G06F 9/451 |
| | | | 715/825 |
| 2006/0218232 A1* | 9/2006 | Kubala | G06Q 10/107 |
| | | | 709/224 |
| 2007/0124312 A1 | 5/2007 | Simpson et al. | |
| 2008/0034043 A1* | 2/2008 | Gandhi | G06Q 10/00 |
| | | | 709/206 |
| 2011/0225257 A1 | 9/2011 | Tilden et al. | |
| 2012/0011449 A1 | 1/2012 | Sasson et al. | |
| 2014/0112319 A1 | 4/2014 | Morris | |
| 2014/0172929 A1 | 6/2014 | Sedayao et al. | |
| 2014/0343989 A1* | 11/2014 | Martini | H04L 63/20 |
| | | | 705/7.17 |
| 2014/0359040 A1 | 12/2014 | Daly et al. | |
| 2014/0379831 A1 | 12/2014 | Gerstl et al. | |
| 2015/0261956 A1* | 9/2015 | Anderson | G06F 21/57 |
| | | | 726/22 |
| 2016/0277315 A1 | 9/2016 | Miller et al. | |
| 2017/0097760 A1 | 4/2017 | Coppola | |
| 2019/0369851 A1 | 12/2019 | Coppola | |

\* cited by examiner

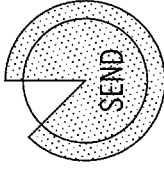

FIG. 5A

| DAVID PEARSON | PERSONAL | MONDAY AUGUST 21 6:00 PM |
|---|---|---|
| RCAPITAL | NEW BUSINESS | MONDAY JULY 24 6:00 PM |
| HOPE CRANE | CONTRACTS | TOMORROW 3:00 PM |
| MARC WATSON | CONTRACTS | TODAY 3:00 PM |
| JILL MARKS | PETERSON ACCOUNT | 35 MINUTES |
| ☰ | + | 8:15 AM |

| DUFFY CULLIGAN | MUSIC VIDEOS | 33 MINUTES |
|---|---|---|
| X | + | 8:15 AM |
| SEARCH | | |
| PAUSE | | |
| INVITE PEOPLE | | |
| NOTIFICATIONS | | |
| SETTINGS | | |
| EDIT PEOPLE | EDIT SUBJECTS | EDIT TIMES |

| CHOOSE PERSON | CHOOSE SUBJECT | CHOOSE LENGTH |
|---|---|---|
| CUSTOM | | |
| 1 HOUR | | |
| 1 WEEK | | |
| THROUGH WEEKEND | | |
| 24 HOURS | | |
| UNTIL 7AM TOMORROW | | |
| 12 HOURS | | |

| | | |
|---|---|---|
| | | |
| JILL MARKS | PETERSON ACCOUNT | 35 MINUTES |
| ☰ | + | 8:15 AM |

FIG. 5B

| CHOOSE PERSON | CHOOSE SUBJECT | CHOOSE TIME |
|---|---|---|
| + NEW PERSON | | |
| ★ DUFFY | | |
| ★ SUE AHN | CHAT CALL | |
| ★ MIKE ZAKIN | | |
| PETER BRANT | CALL | |
| ELIZABETH MINZES | | |

| DUFFY | CHOOSE SUBJECT | CHOOSE TIME |
|---|---|---|
| | | |
| FAMILY | | |
| BUSINESS | CHAT CALL | |
| PERSONAL | | |

| DUFFY | PERSONAL | CHOOSE TIME |
|---|---|---|
| CUSTOM TIME | | |
| TIME PERMITTING | | |
| 1 WEEK | | |
| END OF WORK WEEK | | |
| 24 HOURS | | |
| 12 HOURS | | |
| END OF WORK DAY | | |
| 1 HOUR | | CALL |
| 20 MINUTES | | CALL |

FIG. 6

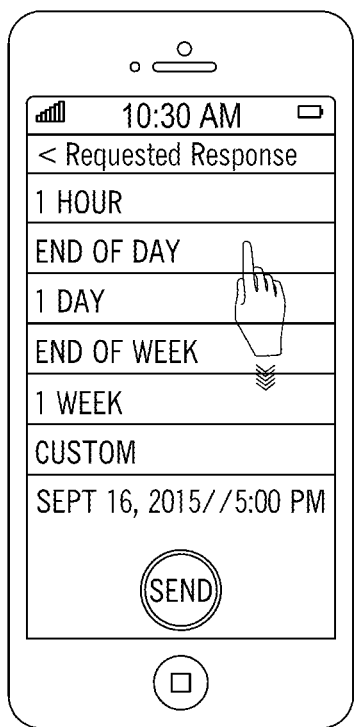 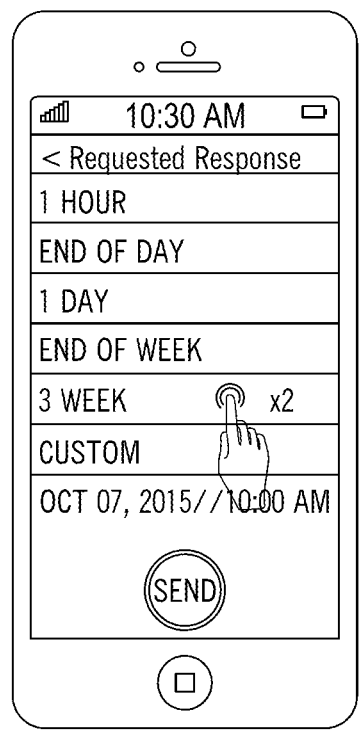
FIG. 13A  FIG. 13B
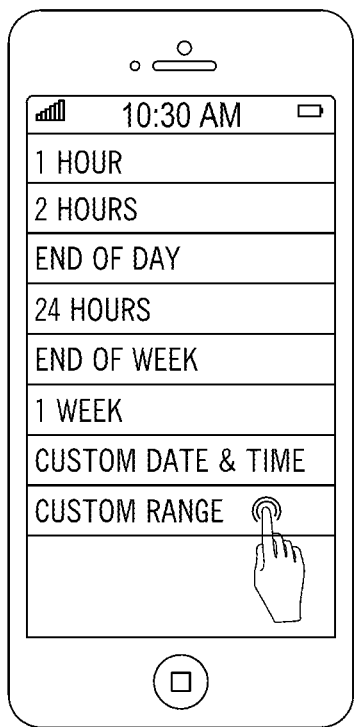 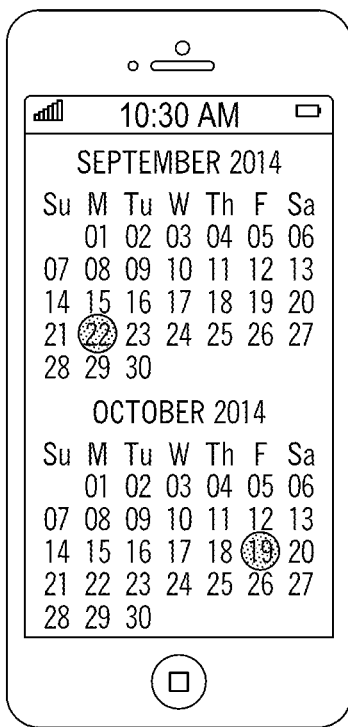 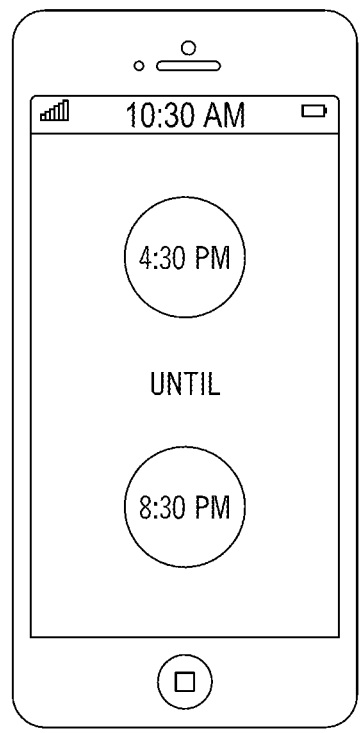
FIG. 13C  FIG. 13D  FIG. 13E

CASBU

```
Casbu struct {
  Id                bson.ObjectId    UID
  CreatedBy         bson.ObjectId    User
  ToUser            bson.ObjectId    User
  SubjectId         bson.ObjectId    Subject
  Content           string           CONTENT JSON
  ParentId          bson.ObjectId    Parent UID
  IsReplied         bool
  DueTime           time.Time
  DueTimeDisplay    string           Helper for due date formatting
  SearchKeywords    string
  IsRead            bool
  IsArchived        bool
  DeletedBy         bson.ObjectId    User
  CreatedAt         time.Time
  UpdatedAt         time.Time
  Priority          int
  SubjectName       string
  SenderUsername    string
  ToUsername        string
  DeliveryTime      time.Time
  CC                bson.ObjectId    User CC'ed
  TBC               bool
  IsPaused          bool
  TimeSelected      int              Helper for time page toggling
```

See FIG. 17C

See FIG. 17B

See FIG. 17A

FIG. 16

CONTENT JSON

Content {
    Question {
    # can be many annotations to a question
        Annotation{
            String:String
            createdBy:User
        }
    }
    # can be many answers to a question
    Answers {
        type:[all smartfield types]
        content:[varies per type]
    # can be many annotations to an answer
        Annotation {
            String:String
            createdBy:User
        }
    }
}

FIG. 17A

SUBJECT

Subject struct {
    Id              bson.ObjectId   UID
    UserId          bson.ObjectId   User
    Name            string
    Privacy         string            Not boolean for future flexibility
    OpenForUsers  bson.ObjectId   User(s)
    CreatedAt       time.Time
    UpdatedAt       time.Time
    IsFavorite      bool

FIG. 17B

USER

User struct {
    Id              bson.ObjectId   UID
    Username       string
    Email           string
    HashPassword  byte
    Origin          string            Will be used for future location details
    PhoneNumber   string
    CreatedDate   time.Time

FIG. 17C

MULTI-LEVEL CONSTRAINED COMMUNICATION SYSTEM

CROSS-REFERENCE TO RELATED APPLICATIONS

The present application is a continuation of U.S. application Ser. No. 17/128,482, filed Dec. 21, 2020, and entitled "MULTI-LEVEL CONSTRAINED COMMUNICATION SYSTEM," which claims priority to U.S. application Ser. No. 16/239,000, filed Jan. 3, 2019, and entitled "MULTI-LEVEL CONSTRAINED COMMUNICATION SYSTEM," which claims priority to U.S. application Ser. No. 15/287,208, filed Oct. 6, 2016, and entitled "MULTI-LEVEL CONSTRAINED COMMUNICATION SYSTEM," which claims priority to U.S. Provisional Patent Application No. 62/237,979, entitled "COMMUNICATION AND MESSAGING SYSTEM," and filed on Oct. 6, 2015, all of which are hereby incorporated by reference herein in their entireties.

BACKGROUND

With the advent of the internet and other digital communication systems, a variety of communication methods have proliferated. Text messages, e-mails, application-specific messaging platforms, video-chat, and various other formats allow users to communicate in a variety of formats and manners. A single user may have access to a variety of messaging systems that each operate in different manners. For example, an e-mail system may allow users to communicate through drafting, replying, and forwarding messages. Other users having accessible e-mail addresses may be added or removed from conversations, e.g., by adding or deleting users. Other messaging systems such as text messages, chat platforms, or video communication systems may facilitate different forms of communication with different combinations of additional users.

Along with the expansion of communication systems there has also been an expansion in the ability to store and search messages and communications. E-mail threads may have numerous related messages and may break off into various threads. Text and chat messages may be searchable and may be permanently stored and available, while video voice messages may be stored, and in some cases, searchable based on audio or video content. The availability of numerous communication platforms, quick and simple messaging, and large and searchable storage systems results in a fragmented system, in which many users must monitor various accounts and various types of communications, resulting in distraction and lost productivity. Large amounts of data are stored in forms that while searchable are not easily accessible, for example, as numerous related e-mail messages or chat messages.

BRIEF DESCRIPTION OF THE DRAWINGS

The above and other features of the present disclosure, its nature and various advantages will be more apparent upon consideration of the following detailed description, taken in conjunction with the accompanying drawings in which:

FIGS. 4A-4B show exemplary graphical user interfaces in accordance with some embodiments of the present disclosure;

FIGS. 5A-5B show additional exemplary graphical user interfaces in accordance with some embodiments of the present disclosure;

FIG. 6 shows additional exemplary graphical user interfaces in accordance with some embodiments of the present disclosure;

FIGS. 13A-13E show additional exemplary graphical user interfaces in accordance with some embodiments of the present disclosure;

FIG. 16 depicts an exemplary persistent data structure for a CAC in accordance with some embodiments of the present disclosure; and FIGS. 17A-17C depict exemplary data structures within a CAC in accordance with some embodiments of the present disclosure.

DETAILED DESCRIPTION

A framework is provided to allow users to create actionable, concise communications ("CAC") to facilitated structured communications with one or more other users. In embodiments, a plurality of constraints are provided to the user that creates the communication. Constraints may be system-based, initiator-based, participant-based, or based on other relevant information such as groups, projects, time constraints etc. In some embodiments, a hierarchy of constraints may be based on users and user priorities, e.g., such that the constraints provided by certain users (e.g., having higher priority levels within a project or organization) take priority over other users. For example, an employee may generate a CAC that is directed to one or more other users having similar priority as well as a user having a higher priority level. The generator of the CAC may be restricted to constraints of higher-priority user, such as certain subjects that are available for CACs as well as certain response selections (e.g., yes/no, radio buttons, text) etc. that are open to particular initiators or subjects.

An interface may be provided to the user to create the CAC based on the available constraints for the particular users, conversations, groups, etc. The selections may be limited based on this information, and based on the user inputs, a CAC data structure may be created. The CAC data structure may include information about the particular CAC, such as users, constraints, selection options, text fields, priority information, and other suitable information as described herein. Constraints may include time information such as preferred response time for the CAC, which may be used with other information (e.g., initiator, subject, selection options, queries, groups, participant, etc.) to provide information relating to priority (e.g., a priority rank) for a particular CAC as it is circulated to various participants.

A participant may have a feed of CACs that may be created based on the stored data structure, which may be located at a centralized location or may be updated at different users' devices as the CAC is modified. The CAC may be an updateable working record of the communication stream, constraints, and responses that may be updated at the centralized location and/or at individual devices. In this manner, a single record of the structured and constrained communication may be maintained and available for use, as well as being accessible for later review and/or search. Once an action that is associated with the CAC has been completed, appropriate responses and notifications may be provided to users, and the CAC may be removed from an active display of each user, e.g., by archiving the CAC.

Figure 1:
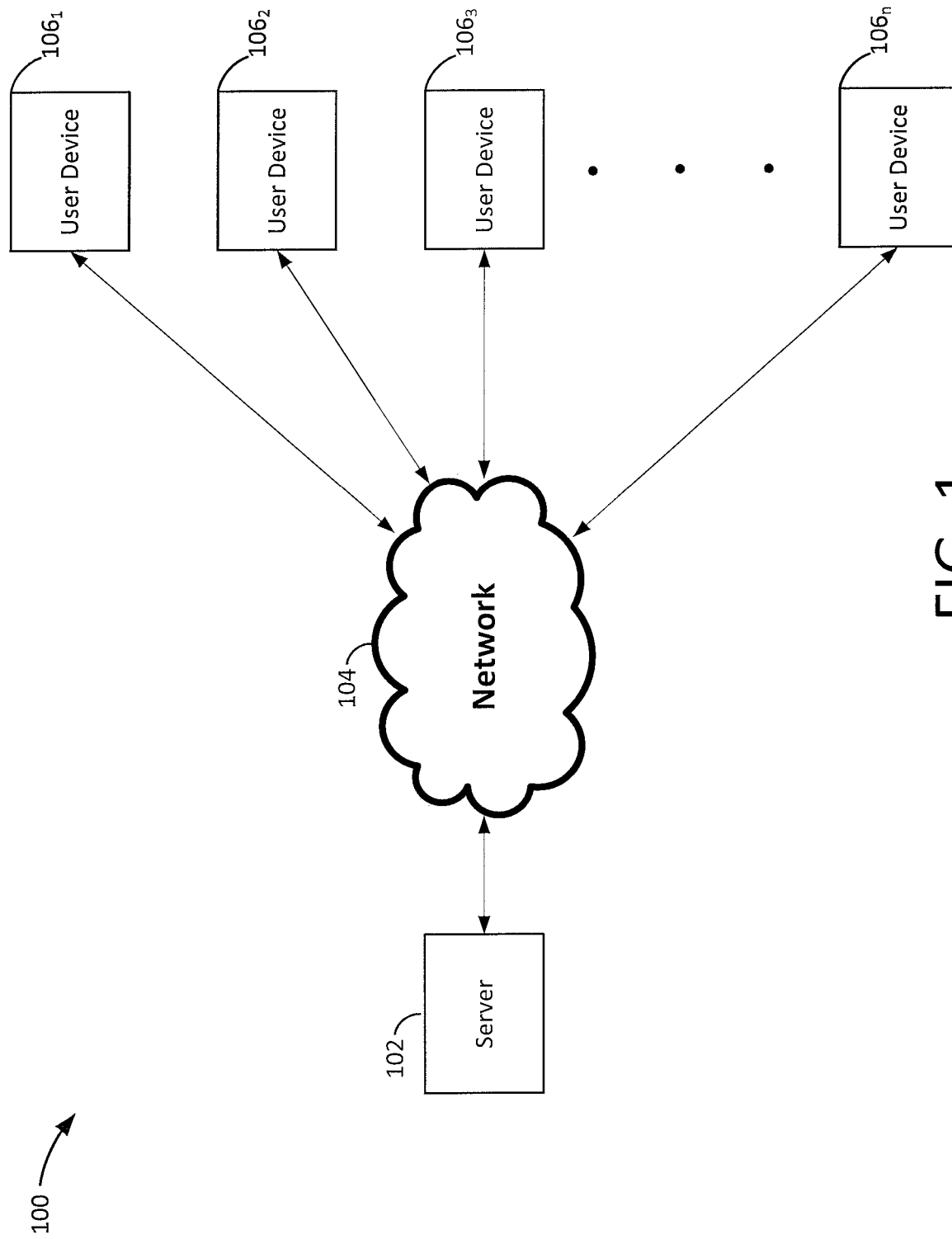
FIG. 1 shows an illustrative block diagram of a concise actionable communication ("CAC") system in accordance with some embodiments of the present disclosure.

FIG. 1 depicts an illustrative block diagram of a constrained communication system 100 in accordance with some embodiments of the present disclosure. In one embodiment, constrained communication system 100 includes CAC server 102, a network 104, and a plurality of user devices 106. The components of constrained communication system 100 relate to systems, methods and interfaces for structured and constrained communications between two or more users, in which the types of communications that may be initiated are limited based on the messaging structure and constraints, as described herein.

In an embodiment, CAC server 102 may be a computing device, such as a general hardware platform server configured to support mobile applications, software, and the like executed on user device 106. CAC server 102 may include one or more processors executing code stored on a computer readable medium as well as databases storing information relating to various constraints for different entities and users that are participating in the constrained communication system 100. In an embodiment, physical computing devices may reside with various users and may be deployed in a cloud computing or similar network environment in which different devices and device types may access common or shared computing resources that are available over a data network such as the internet or cellular networks. An exemplary cloud model may utilized a variety of network resources (e.g., on-demand self-service, broad network access, resource pooling, rapid elasticity, measured service, etc.) and operational models (e.g., Software as a Service ("SaaS"), Platform as a Service ("PaaS"), Infrastructure as a Service ("IaaS")).

In an embodiment, CAC server 102 may include computer-usable or computer-readable media storing instructions and data for use with the constrained communication system, such as a computer diskette, a hard disk, a random access memory (RAM), a read-only memory (ROM), an erasable programmable read-only memory (EPROM or Flash memory) device, a portable compact disc read-only memory (CDROM), optical storage device, magnetic storage device, or any other suitable medium capable of storing instructions or data for execution and access by the CAC server. In embodiments, CAC server 102 may include a processing device, a communication interface, a user interface and a memory device, as described more fully in FIG. 2.

In some embodiments, CAC server 102 may generate, store, and distribute CACs based on input and requests from one or more user devices 106, for example, over a network 104. In an embodiment, CAC server 102 processes a CAC between a plurality of user devices 106, such as a smart phone, tablet computer, laptop computer, desktop computer, wearable computer, personal data assistant, or similar devices including suitable hardware and software (e.g., executing a constrained communication application) that is configured to process instructions, store information relating to constrained communications, and connect to network 104.

In some embodiments, network 104 includes a number of different communication resources that enable communication between user devices 106 and CAC server 102. Network 104 may be a wired, wireless, terrestrial microwave, or satellite link networks such as the Internet, an intranet, a LAN, a WAN, a cellular network (e.g., LTE, HSPA, 3G, and other cellular technologies) and/or another type of network. In embodiments, network 104 may comprise any number, type, and/or configuration of networks that may provide digital or other information over a communication channel. According to some embodiments, the network 104 may comprise a number of different sub-networks and/or network components interconnected, directly or indirectly.

Exemplary user devices 106 may be suitable devices with user and communication interfaces, such as a smart phone, tablet computer, laptop computer, desktop computer, wearable computer, personal data assistant, or similar devices that facilitate network communications and user interface functions by users, based on communications with CAC server 102. Exemplary user devices 106 may include a processing elements, communication devices (e.g., cellular, WiFi, Ethernet, etc.), a user interface (e.g., mouse, keyboard, touchscreen, voice, holographic display, etc.), and memory as more fully described with respect to FIG. 3 herein.

User devices 106 may access CAC server 102 directly (e.g., a dedicated terminal) or via a communication channel such as the internet. In exemplary embodiments, user devices 106 may utilize a dedicated application or internet browser to access a user interface provided by CAC server 102 and communicated via a suitable protocol (e.g., as encrypted data provided via a Hypertext Transfer Protocol (HTTP) interface). The CAC application may provide a user interface that facilitates user creation and modification of CACs. Menus, selections, and related user interface options may provide for the selection of options (e.g., by modifying constraints, participants, selections, modifications to priority, etc.) and other related functionality. As will be described herein, a user may initially generate a CAC based on options that are limited by the available constraints for a particular communication, e.g., based on constraints or structures that are determined as a result of selected participants, groups, subject matter, etc.

Figure 2:
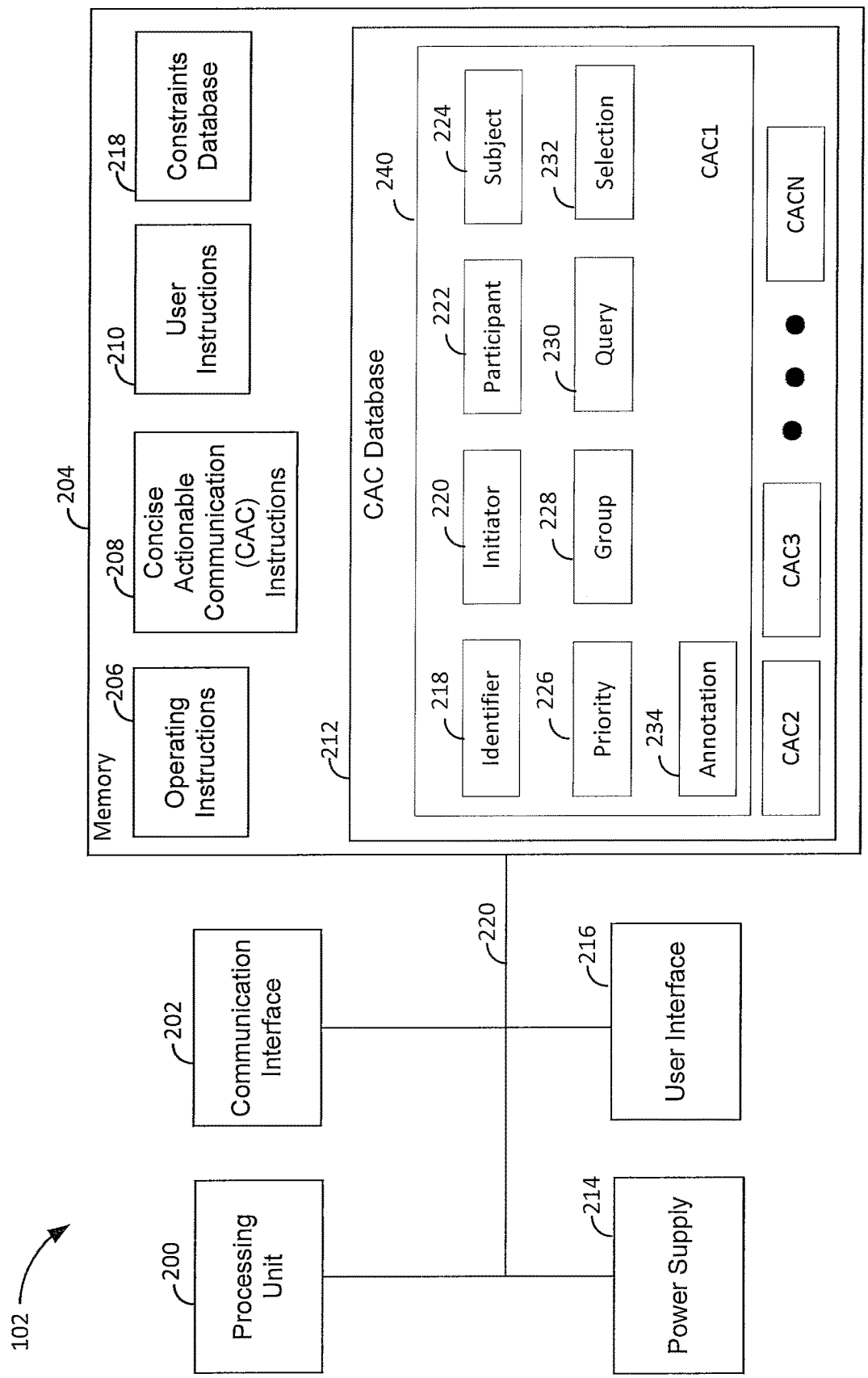
FIG. 2 shows an illustrative block diagram of a communication server in accordance with some embodiments of the present disclosure.

FIG. 2 depicts an illustrative block diagram of a CAC server 102 in accordance with some embodiments of the present disclosure. Although the CAC server 102 is depicted as a single exemplary server, it will be understood that the operations and memory of the CAC server 102 may be distributed over any suitable number of servers and devices. Although particular components are depicted in a particular arrangement in FIG. 2, it will be understood that CAC server 102 may include additional components, one or more of the components depicted in FIG. 2 may not be included in CAC server 102, and the components of CAC server 102 may be rearranged in a variety of manners to implement the operations and functionality described herein. In an exemplary embodiment, CAC server 102 includes a processing unit 200, a communication interface 202, a memory 204, an interface bus 220, a power supply 214, and a user interface 216.

Processing unit 200 may be any suitable processing element and may include hardware, software, memory, and circuitry as is necessary to perform and control the functions of CAC server 102. Processing unit 200 may include one or more processors that may be configured and connected in a manner to perform the operations of CAC server 102 based on instructions in any suitable number of memories and memory types.

Processing unit 200 can be in communication with memory 204 (e.g., read only memory (ROM) and random access memory (RAM)), storing processor-executable instructions and that are executed by the processing unit 200 in order to control and perform the necessary operations of the CAC server 102 as well as data and information that may be accessible for generating and distributing CACs between system users. In embodiments where processing unit 200 includes two or more processors, the processors may operate in a parallel or distributed manner. Processing unit 200 may execute an operating system of CAC server 102 or software associated with other elements of CAC server 102.

In one embodiment, the processing unit 200 may be implemented as dual microprocessors, multi-core and other multiprocessor architectures running instructions for an operating system, programs, and applications based on processor-executable instructions that may be stored in memory 204. The processing unit 200 may execute the instructions of memory 204 to interact with and control one or more other components of the CAC server 102. Although the processing unit 200 may communicate with other components of the CAC server 102 in any suitable manner, in one embodiment the processing unit may utilize an interface bus 220. Interface bus 220 may include one or more communication buses such as I2C, SPI, USB, UART, and GPIO. In one embodiment, the processing unit 200 may execute instructions of the memory and based on those instructions may communicate with the other components of the CAC server 102 via the communication buses of interface bus 220.

The memory 204 may include any suitable memory types or combination thereof as described herein, such as flash memory and RAM memory, for storing instructions and other data generated or received by CAC server 102 and providing a working memory for the execution of the operating system, programs, and applications of the CAC server 102. In embodiments, memory 204 may be configured to store information received from user devices 106, constraints related to the generation and distribution of CACs, and information about individual CACs.

In one embodiment, the memory 204 may include a plurality of sets of instructions, such as operating instructions 206, CAC instructions 208, and user instructions 210. In one embodiment, memory 204 may include one or more data stores, such as a constraints database 218 and a CAC database 212.

In an embodiment, operating instructions 206 may include instructions for interacting with user devices 106. An exemplary CAC server 102 may communicate with user devices 106 via the communication interface 202, e.g., to receive information relating to CACs to be generated and to distribute information about the CACs to the user devices. Operating instructions 206 may include instructions that when executed by processing unit 200 control these communications and provide for secure communication by implementing procedures such as TLS and SSL, and in some embodiments, encrypt and decrypt some or all of the information communicated with the user devices 106 via public or private key cryptography, or other similar methods.

Exemplary operating instruction 206 may also include instructions for managing stored data structures in memory such as the CAC database 212 and constraints database 218. In embodiments as described herein, CAC database 212 and constraints database 218 may be created and updated based on information provided by users during system setup and configuration, for example, relating to projects, groups, priority levels, timing settings, and other similar information. Operating instructions may provide for management of the databases and related data storage locations in a manner such that constraint and CAC information is continuously stored and updated.

In some embodiments, memory 204 may comprise a CAC database 212 that is addressable by processing unit 200 for storing a CAC data structure 240 associated with CACs that are generated and modified by users operating a program at user devices 106 and in communication with CAC server 102. In an embodiment, CAC database 212 may be relational and store one or more data structures 240 in a variety of tables having key/value pairs that may be used to access, store, and update information about CACs.

Although a CAC data structure 240 may include a variety of suitable types of information, in an embodiment a CAC data structure 240 may include information such as an identifier 218, an initiator 220, participants 222, a subject 224, priority information 226, a group 228, a query 230, a selection 232, and an annotation 234.

In an embodiment, data structure 240 may include an identifier 218 that uniquely identifies a CAC that is created by an initiator. Because CAC server 102 may process multiple CACs from multiple users, in some embodiments each CAC may include a unique identifier that may be used to create, query, or otherwise access the CAC data or information.

CAC Data structure 240 may include an initiator data structure 220. An initiator data structure 220 may by a user who creates a CAC, for example, based on available constraints for the particular users and/or groups associated with the CAC. The initiator may cause the creation of the CAC, may select initial participants, subjects, etc., and based on this information, may provide additional inputs based on required constraints. In an embodiment, an initiator field may include an identifier or similar information that provides a unique reference for the initiator, and that may be used to access other information related to the initiator such as available constraints, participants, selection options, priority information, etc. In some embodiments unique information related to an initiator may be stored and directly accessible via the initiator data structure 220, or in some embodiments, may be accessible from other storage such as a from constraints database 218.

An exemplary CAC Data structure 240 may include a participant data structure 222 which may include information that provides a unique identifier for one or more participants of the CAC. The participant data structure may store information about each participant (e.g., available subjects, user priorities, priority settings, etc.), or in some embodiments, some or all of the data may be stored and accessible from elsewhere such as a constraints data structure 218. In embodiments, the participant data structure may provide a number of constraints and structural limitations that restrict the options that are available to the initiator. In exemplary situations with multiple participants, the constraints imposed by the participant data structures may be based at least in part on relative priorities associated with each user (e.g., such that subjects and selection options may only be permitted to the extent that they overlap with those of the highest priority user, or a suitable proportion of users having equivalent priorities).

In an embodiment, CAC Data structure 240 may include a subject 224. In an embodiment, subject 224 may be one or more participant-defined subjects (e.g., project A, project B, work, personal, vacation, social, family, etc.) to which a CAC relates (e.g., based on information accessible from a constraint database 218). For example, if a participant 222 and an initiator 220 have an upcoming trip to Brazil, the participant 222 may define a subject 224 called "Brazil trip" that may be stored as a subject in a constraint database. Information may be associated with the subject such as other participants who may communicate regarding the subject, the priority of the subject, time limitations for providing high priority reminders, and other similar information. In an embodiment, participant 222 may authorize a particular initiator 220 to create a CAC related to the "Brazil trip." In this manner, initiator 220 may be permitted to create a CAC related to the Brazil trip based on constraints provided by the constraint database 218. In an embodiment, subject 224 may relate to any area deemed appropriate by the participant 222. In an embodiment, if a participant 222 does not authorize any subjects 224 to a particular initiator 220, the initiator 220 cannot send a CAC related to that subject to the participant 222 (e.g., based on the subject not being accessible to the particular initiator 220.

CAC Data structure 240 may include a query 230. Query 230 may include information that is provided such that the participants have additional information related to the subject 224 within that CAC. Query 230 may include information in a variety of formats such as text entries, images, GIFs, video clips, links, e-mails, audio clips, other suitable information, and combinations thereof. In an embodiment, as discussed above, if a participant 222 and an initiator 220 have an upcoming trip to Brazil, the participant 222 may define a subject 224 called "Brazil trip." In an embodiment, participant 222 may authorize an initiator 220 to send one or more queries related to the "Brazil trip" (e.g., "Have you talked to Dave about Brazil?", "When do you want to leave?", links to accommodation or flight information, a video message, suitable combinations thereof, etc.).

CAC Data structure 240 may include one or more selections 232. In an embodiment, selection 232 may include options for a participant 222 to select initiator 220 defined responses to a query 230 related to a subject 224. In an embodiment, the selections 232 are defined by an initiator 220 based on available options provided by the system (e.g., based on available constraints determined from priority, user, and group settings). Instead of providing for an open-ended response to the query, the initiator 220 may provide a plurality of selections 232 for a single query 230. In some embodiments, the selections may be hierarchically nested, such that depending on a first response (e.g., "YES" in response to "have you reviewed the latest proposals") additional selections may be provided (e.g., relating to selection between a number of proposals). In some embodiments, the selection 232 itself may be in the form of a media such as video, audio, GIFS, etc. A participant 222 may respond by selecting among the participant-defined selections 232, and in some embodiments, may provide additional materials with response such as text information, video, audio, GIFs, etc.

CAC Data structure 240 may include priority information 226. In an embodiment, priority information 226 may provide a priority to be provided to participants 222 for use in displaying the CAC, providing notifications, and otherwise determining the manner in which the CAC will be displayed to the participants 222. The priority may be based on a variety of constraints including entries by the initiator 220, settings for particular subjects by the initiator 220 and/or participants 222, participants' assigned priorities for CACs created by a particular initiator, due data due date and time, other suitable factors as described herein, and any combination thereof. In some embodiments, the constraints for particular users, subjects, groups, etc. may be accessible from the constraints database 218 or from communications with a participant or initiator device, and may be processed based on CAC instructions 208 to determine the priority for the CAC.

CAC Data structure 240 may include one or more annotations 234. In an embodiment, annotation 234 may be a note or comment added to the CAC by the initiator 220 and/or participants 222 which may provide further insight or explanation related to the CAC. In an embodiment, annotation 234 may be in form of a text communication, audio, video, GIF, links, other suitable information, or combinations thereof.

CAC Data structure 240 may include a group 228. A group 228 may identify a set of users who may communicate via a CAC, or in some embodiments, different types of access available to different users. For example, a group may be closed such that CACs may not be shared with any individuals outside of a group, or different users may be provided with different permissions such that only certain users can initiate or edit CACs, view certain materials or subjects, or participate in other relevant aspects of the communications. The group 228 may also provide constraint information for that group, which may be used in limiting the types of queries, selections, and priorities that are associated with any CACs exchanged within the group.

In an embodiment, CAC server 202 may include a constraints database 218. In an embodiment, information relating to constraints may be stored at the constraints database, and may be based on relevant categories such as user, group, subjects, and other suitable categories as described herein. In an embodiment, a user may have constraints relating to other users that may initiate CACs, available subjects, associations between subjects and users, available selections, associations between selections and subjects, associations between selections and users, priorities associated with particular time information (e.g., when to identify a message as moving to a different category of urgency), groups associated with a user, and other suitable information. In a similar manner, groups may have constraints associated therewith, including permissions, members, available subjects and selections, time-related limitations, and other suitable information. Any of these constraints may have priorities associated therewith, such that the ultimate priority 226 associated with a particular CAC is determined based on an overall priority level determined from the various relevant constraints for the CAC (e.g., based on an weighted average as determined by CAC instructions 208).

CAC instructions 208 may include instructions for processing CACs exchanged between users. In an embodiment, the CAC instructions may provide instructions for storing CAC data received and processed by the system 100 (e.g., CAC data structure information).

In an embodiment, CAC instructions 208 may cause CAC server 102 to provide a centralized platform for users to manage CACs. In an embodiment, CAC instructions 208 may provide instructions for sharing persistent CACs between users. For example, if a participant 222 responds to or modifies a CAC, the updated CAC may be presented to the initiator 220 so that the users (e.g., the participant 222 and initiator 220) have access to the same CAC at any particular time. In the case of any updates to an existing CAC, the CAC instructions 208 may update the CAC data structure 212 to reflect the update, identify the user the providing the update, and provide information relating to the updated CAC to the participants and/or initiator.

In an embodiment, user instructions 210 may include instructions relating to users of the constrained communication system 100. Exemplary user instructions 210 may provide for analysis of credentials (e.g., login, password, biometric information, etc.) for users and may include information relating to communications with users, such as available devices, required security procedures, user availability, and similar related information for each user.

User instructions 210 may include instructions for processing a plurality of CACs between and among users. In an embodiment, user instructions 210 may identify CAC user information for the plurality of CACs and sort the CAC user information according to desired sorting criteria. In general, the user instructions 210 can gather and sort information about the users that exchange CACs processed by the CAC server 102. In an embodiment, user instructions 210 may allow a participant 222 to select certain settings for a user (e.g., an initiator 220). For example, in an embodiment, user instructions 210 may allow a participant to give authorization to certain users to send the participant a CAC. In an embodiment, user instructions 210 may allow a participant to select when the participant is available to receive an alternative form of communication, such as a call or text chat, relating to a CAC received from the authorized user.

In an embodiment, user instructions 210 may analyze CAC user information for each user to determine the number of CACs associated with a user. In an embodiment, user instructions 210 may monitor the number of CACs created by or assigned to a particular user. User instructions 210 may track the number of CACs that have been exchanged over time, and can monitor whether those CACs are ongoing or closed.

In an embodiment, user instructions 210 may organize CAC users into one or more user groups. For example, the user instructions 210 may recognize when groups of users are affiliated with one another, such as being members of the same organizational team or users working on the same project. In an embodiment, user instructions 210 may associate a user with multiple other users over the course of exchanging CACs with other users. For example, each user may have or be associated with a participant list. The participant list can include a list of one or more participants that the user has exchanged at least one CAC with. Thus, each user can form a network of related users in which a CAC has been exchanged.

In an embodiment, user instructions 210 may sort the participant list based at least in part on the frequency with which the participant has been sent a CAC. In an embodiment, priorities can be determined for participants on each user's participant list based on the each participant's rank within the participant list. For example, user ranks can be assigned to participants based on the frequency with which the participant(s) has received a CAC from a user. If a participant has more frequent and/or more recent interaction with the user who created the CAC, the participant may be assigned a greater rank than a participant user with less frequency and/or interaction. User instructions 210 may thereby automatically prioritize users on a participant list based upon the rank of the user.

Communication interface 202 may be a device that allows CAC server 102 to communicate with another device, such as user device 106, over network 104. Communication interface 202 may include one or more wireless transceivers for performing wireless communication and/or one or more communication ports for performing wired communication. In embodiments, communication interface 202 may establish a secured connection (e.g., via TLS or SSL) with a user device 106 and may be configured to receive information, such as one or more CACs to be processed, from user device 106 via network 104.

User interface 216 may provide various options for managing the constrained communication system, e.g., by an administrator. In some embodiments, administration may be performed remotely, for example, via communication interface 202. In other embodiments, administration may be performed via user interface 216 which may provide a display with options for managing the constrained communication system. In this manner, information such as user information, group information, relative priority assigned to different constraints, and other suitable information may be modified by the administrator for the system.

In some embodiments, the user device 106 may be running a CAC application. The operating instructions 206 may include instructions for a complementary application to run on processing unit 200 in order to communicate information regarding CACs with the CAC application on the user devices 106. For example, the CAC application may provide a user interface that facilitates a user sending a CAC to the CAC server 102 for processing. Menus may provide for the creation of a CAC (e.g., selecting participant, subject, creating queries, specifying selections, etc.) or other related functionality.

CAC server 100 may also include a power supply. Power supply may include power conversion circuitry for converting AC power and/or generating a plurality of DC voltages for use by components of the server. In some embodiments, power supply may include a backup system such as a battery backup, to avoid interruptions in service during power outages. Power supply may supply a variety of voltages to the components of the server in accordance with the requirements of those components.

Although various operations have been described as being performed by the CAC server 202 and information has been described as being stored at CAC server 202, it will be understood that these operations and information may be performed and stored in a distributed manner over a variety of computing devices, including but not limited to user devices 106. In this manner, information may be accessible over the network and each device such as user devices may process and/or store portions of the information utilized by the CACs and CAC system.

Figure 3:
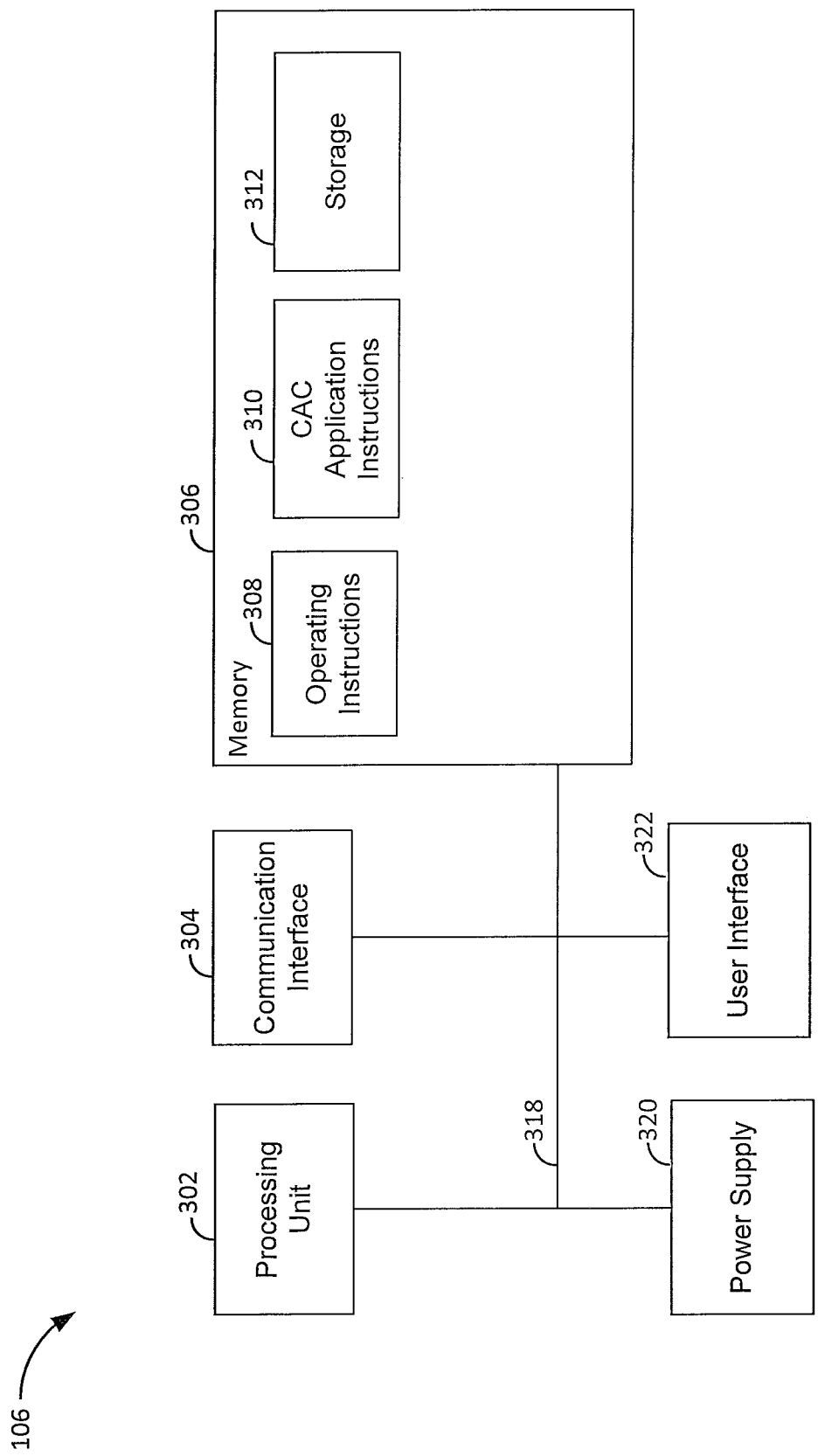
FIG. 3 shows an illustrative block diagram of a user device in accordance with some embodiments of the present disclosure.

FIG. 3 depicts an illustrative block diagram of a user device 106 in accordance with some embodiments of the present disclosure. Although particular components are depicted in a particular arrangement in FIG. 3, it will be understood that user device 106 may include additional components, one or more of the components depicted in FIG. 3 may not be included in user device 106, that additional components and functionality may be included within user device 106, and that the components of user device 106 may be rearranged in a variety of suitable manners. For example, as described above, some or all of the user devices 106 may function as a distributed computing system storing information (e.g., from CAC database 212 and constraints database 218) for the constrained communication system and performing the operations described with respect to the various instructions of the server 102.

In some embodiments, a user device 106 may be implemented as one of a variety of devices, such as a smart phone, tablet computer, smart watch, laptop computer, desktop computer, wearable device, personal data assistant, or other type of electronic device with a hardware processor that is configured to process instructions and interact with CAC server 102 and/or other user devices 106. In an embodiment, user device 106 may include processing unit 302, a communication interface 304, a memory 306, a user interface 318, and a power supply 316.

Processing unit 302 may be in communication with memory 306 (e.g., read only memory (ROM) and random access memory (RAM)) that stores data and processor-executable instructions that are executed by the processing unit 302 in order to control and perform the necessary operations of the user device 106. In embodiments where processing unit 302 includes two or more processors, the processors may operate in a parallel or distributed manner. Processing unit 302 may execute an operating system of user device 106 or software associated with other elements of user device 106.

In one embodiment, the processing unit 302 may be implemented as dual microprocessors, multi-core and other multiprocessor architectures running instructions for an operating system, programs, and applications based on processor-executable instructions that may be stored in memory 306. The processing unit 302 may execute the instructions of memory 306 to interact with and control one or more other components of the user device 106. Although the processing unit 302 may communicate with other components of the user device 106 in any suitable manner, in one embodiment the processing unit may utilize an interface bus 318. Interface bus 318 may include one or more communication buses such as I2C, SPI, USB, UART, and GPIO. In one embodiment, the processing unit 302 may execute instructions of the memory and based on those instructions may communicate with the other components of the user device 106 via the communication buses of interface bus 318.

Memory 306 may refer to suitable tangible or non-transitory storage mediums for storing data, instructions, and other information. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

The memory 306 may include suitable memory types or combination thereof as described herein, such as flash memory and RAM memory, for storing instructions and other data generated or received by user device 106 and providing a working memory for the execution of the operating system, programs, and applications of the user device 106. In one embodiment, the memory 306 may include one or more sets of instructions, such as operating instructions 308 and CAC application instructions 310. In one embodiment, memory 306 may include one or more data stores, such as storage 312.

Operating instructions 308 may include instructions for the general operation of the device, such as operating systems, communication and hardware drivers, graphics and user interface controls, power management, encryption instructions, and other similar instructions related to the normal operations of the user device 106. Operating instructions may interface with CAC application instructions 310 and storage 312 to assist in performing operations related to the constrained communication system, such as by facilitating encrypted communications with the CAC server 102 and other user devices 106, and providing for a user interface to allow initiators and participants to interact with CACs and other aspects of the constrained communication system.

CAC application instructions 310 may include instructions for running a CAC application on user device 106. When executed by the processing unit 302, the CAC application instructions 310 may provide for a rich display of an interactive interface that facilitates a user generating and interacting with a CAC, as well providing for the setup of modification of constraints related to CACs (e.g., user or group constraint settings). In an embodiment, the CAC application may be implemented as a software application having APIs and similar interfaces for interacting with other components or programs running on the user device 106. In some embodiments, the CAC application may be accessed over the internet such as via an interactive website that provides much of the functionality of the application via a protocol such as HTTP (e.g., served from CAC server 102). Exemplary embodiments of an interactive interface are depicted in FIGS. 4-6 and 11-15 and described herein.

In an embodiment, CAC application instructions 310 may include customized interfaces that allow the user to select menus that may provide for the creation and modification of CACs or other related functionality. In some embodiments, the CAC application instructions 310 may include instructions relating to processing of a CAC, such as selection of a participant 222, selection of a subject 224, defining of a query 230, establishing selections, providing constraints, assigning priority, and other functionality described herein. Some or all of the processing of a CAC may be performed by the CAC application or one or more complementary applications installed on the CAC server 102.

CAC application instructions 310 may also include instructions for interacting with a CAC server 102 and other user devices 106. In one embodiment, the user device 106 may communicate with the CAC server 102 and/or other user devices 106 via the communication interface 304. CAC application instructions 310 may include instructions that when executed by processing unit 300 provide for secure communication by implementing procedures such as TLS, SSL or as encrypted data based on keys.

CACs (or aspects thereof) that are presently active for the user may be temporarily stored in local storage such as storage 312 of the user device 106, or in some other suitable storage element (e.g., cache storage) in the user device 106. In some embodiments, some or all of the information for particular CACs may be stored remotely from the user device 106, for example in at the CAC database 212 of the CAC server or at one or more other user devices 106 (e.g., the user device of the initiator, or a primary participant).

User interface 318 may provide various options that allow a user to interact with applications and programs running on the user device 106. While one user interface 318 is shown, an example user interface 318 may include hardware and software for any suitable user interface, such as a touchscreen interface, voice command interface, keyboard, mouse, gesture recognition, any other suitable user interface, or any combination thereof. In exemplary embodiments, user interface 318 may generate user interface screens discussed herein (e.g., FIGS. 4-6 and 11-15) based upon processing unit 302 executing CAC application instructions stored in memory 306.

Power supply 316 may include circuitry for receiving and converting AC power or DC power, and generating a plurality of DC voltages for use by components of the user device 106. In some embodiments, power supply 316 may be a mobile device that includes a battery system, that may be charged in a suitable manner such as from a power supply or via inductive charging. Power supply 316 may supply a variety of voltages to the components of the user device 106 in accordance with the requirements of those components.

FIGS. 4A-4B illustrate exemplary non-limiting implementations of a graphical user interface for a constrained communication system in accordance with some of the embodiments of the present disclosure. In an embodiment, as shown in the first screen shot of FIG. 4A, an initiator may initiate a new CAC by selecting a participant from the initiator's personal participant list. The participant list may include a list of participants with whom the initiator has previously exchanged CACs, members of group, or other participant limitations as described herein.

In an embodiment, as processing unit 302 of a user device 106 may execute CAC application instructions 310 to sort the participant list based on information such as frequency of communications, priority levels, number of shared groups, preferred display settings (e.g., alphabetical, reverse alphabetical, etc.). For example, user ranks can be assigned to participants based on the frequency with which the participant and initiator have exchanged CACs and the priority associated with a particular user. If a participant has more frequent and/or more recent interaction with the initiator, the participant may be assigned a greater rank than a participant having the same priority but with a lower frequency and/or interaction. User instructions 210 may thereby prioritize participants. In an embodiment, if a participant is not shown in the initiator's participant list, the initiator may add a new participant by selecting "ADD NEW PERSON" as depicted in the first screen shot of FIG. 4A, which may provide a directory of available users or groups, or which may (e.g., for a user having suitable permissions) permit an entirely new user to be added to the system.

In an embodiment, as depicted in the second screen shot of FIG. 4A, the initiator may select from a list of subjects (e.g., a subject 224) created and authorized by the participant. In an embodiment, as discussed herein, the initiator is limited to selecting certain subjects, for example, based on shared groups and settings of the primary participant. In an embodiment, a subject may be one or more system, group, or participant defined subject areas (e.g., work, personal, vacation, social, family, etc.) for which a CAC relates and that are available for the particular communication with the particular participant under the circumstances.

In an embodiment, as depicted in the third screen shot of FIG. 4A, the initiator may select a requested response time (e.g. priority information 226) for the CAC. In an embodiment, the response time may be a time frame from when the CAC was sent (e.g. within an hour, within a day, within a week, within a month, etc.), a specific date, such as a month, day, and year, or any suitable response time. As is depicted in the third screen shot of FIG. 4A, response times may be associated with indicators (e.g., by color "heat map," icons, etc.).

In an embodiment (not depicted), the initiator may provide one or more queries 230 (e.g., text, video, audio, GIFs, etc.), which is related to the selected subject. In some embodiments, a user may be required to confirm that the query relates to the subject, or in some instances, the system may analyze the content of the query (e.g., based on accepted terms and phrases for a subject) to confirm that the query is germane to the subject. For example, if the subject "Brazil trip" was made available to an initiator by a participant, the question may relate to the "Brazil trip" (e.g., "When do you want to leave?" and/or "Are we meeting with John in Brazil?"). In an embodiment (not depicted), the initiator may create possible answers (e.g., selections 232), which include one or more options for answers to the one more questions created by the initiator. For example, in response to the question "When do you want to leave?" relating to the "Brazil trip" subject, an initiator may give the participant certain options (e.g., selections 232), such as "next week", "next month" or "Sep. 29, 2016" as answers to the question. In an embodiment, the participant is limited to the answers provided by the initiator.

FIG. 4B illustrates an additional exemplary non-limiting implementation of a constrained communication platform graphical user interface in accordance with some of the embodiments of the present disclosure. In an embodiment, as shown in the first screen shot of FIG. 4B, a participant may be presented with a CAC queue, which may provide all outstanding CACs to the participant for which a response is required. As discussed herein, a CAC may have a priority based on information such as a due date. In an embodiment, a participant's CACs may be queued by due date priority and displayed with a color heat map, and the CACs provided in an order that corresponds to relative priority among the CACs (e.g., in FIG. 4B, the CACs having the highest priority located at the bottom of the queue). In an embodiment, CACs may be color coded based on absolute priority, and change color as their priority changes (e.g., blue=lowest priority, green=low priority, yellow=medium priority, red=high priority, black=overdue). In the embodiment depicted in FIG. 4B, these priorities may be associated with the time that CAC is due. In an embodiment, the participant may select a CAC from the queue to open, view, and respond to the CAC content.

The second screen shot of FIG. 4B depicts an exemplary non-limiting graphical user interface of a CAC query and selections presented to a participant after selection of a CAC from the participant's queue. In the embodiment shown in FIG. 4B, the participant is presented with a query and two possible selections (e.g., Friday and Tuesday). In an embodiment depicted in the third screen shot of FIG. 4B, the participant may select a preferred selection (e.g., Friday). In an embodiment, the participant's preferred answer may change color from its previous color to depict that the participant has accurately selected the answer. In an embodiment, once the participant has selected the preferred answer, the participant may select send (depicted in the fourth screen shot of FIG. 4B) to update the CAC based on the response and to notify the initiator and other participants of the response. As depicted in FIG. 4B, the progress of the update may be depicted.

FIGS. 5A-5B illustrate additional exemplary non-limiting implementations of a constrained communication system graphical user interface in accordance with some of the embodiments of the present disclosure. In an embodiment, depicted in the first screen shot of FIG. 5A, a participant may be presented with a CAC queue. In an embodiment, at the bottom of the CAC queue, the participant may access a menu bar, which may provide various settings for management of CACs. In an embodiment, a pause setting (depicted in the second screen shot of FIG. 5A) may be presented to the participant in the menu bar. The participant may select from a variety of options, such as Search, Pause, Invite, Notifications, Edit People, Edit Subjects, and Edit Times. In an exemplary embodiment depicted in FIG. 5A, the "PAUSE" menu item may be selected. Once the participant selects the pause menu item, the participant is presented with options (depicted in the third screen shot of FIG. 5A) to select the length of time that the CAC queue should be paused. In an exemplary embodiment, the CAC queue may be paused based on a number of category types (e.g., subjects, groups, users, etc.) or combinations of categories in combination (e.g., subjects and groups, users and subjects, groups and users, etc.). In an embodiment, the participant may select a length of time (e.g., 1 hour) for which items in the queue should be displayed. As depicted in FIG. 5A, by selecting 1 hour, only items that are due within one hour or overdue will be displayed based on the one hour selection.

In another exemplary embodiment, the participant may select to pause based on both a length of time (e.g., pause messages that are due for more than 24 hours) and a subject (e.g., pause for all subjects but "Contracts"). In an embodiment, by selecting 24 hours and all subjects but Contracts, only items due within 24 hours or overdue and items related to Contracts will be displayed. In this embodiment, of the messages depicted in FIG. 5A, only CACs from Marc Watson would be displayed (e.g., Hope Crane, RCapital, and David Pearson would be excluded by time and Jill Marks would be excluded by subject). If the participant were to additionally choose to pause CACs initiated by Marc Watson in addition to the time (24 hours) and subject (Contracts), no CACs would display in the queue at the present time.

In other embodiments, the menu bar may allow a user to perform other functionality. For example, in an embodiment, a user may select "SEARCH" to search for a specific CAC or a specific user. In another embodiment, a user may send invitations to other users to exchange CACs. In an embodiment, a user may set notification settings, such as notifications for received CACs or notifications for new user request, from the menu bar. In another embodiment a user may select various other settings from the menu bar (e.g., how CACs are displayed in the queue, color coding for the display of the CAC queue, what users are allowed to send CACs, what subjects are available to certain users, priority levels associated with users and subjects, etc.).

FIG. 5B illustrates an exemplary non-limiting graphical user interface of an initiator creating a CAC in accordance with some embodiments of the present disclosure. In an embodiment, an initiator 220 may select information to create a CAC including selections for a user, a subject, and a time. As is depicted in the far left screen of FIG. 5B, a plurality of participants may be presented to the user, e.g., resulting in a selection of "Duffy." In some embodiments, different users may provide options to directly call or chat with the user, based on settings of the participant with respect to a particular group or participant. Once a participant is selected, a number of subjects may be provided for the user. As with the participant selection, different subjects may be available for direct communications such as a chat or call (e.g., "Business" in FIG. 5B) while other topics may only be available for constrained communications. Once a subject is selected, the initiator may be presented with additional information such as a time selection to indicate when a response to the CAC is required.

Figure 6:
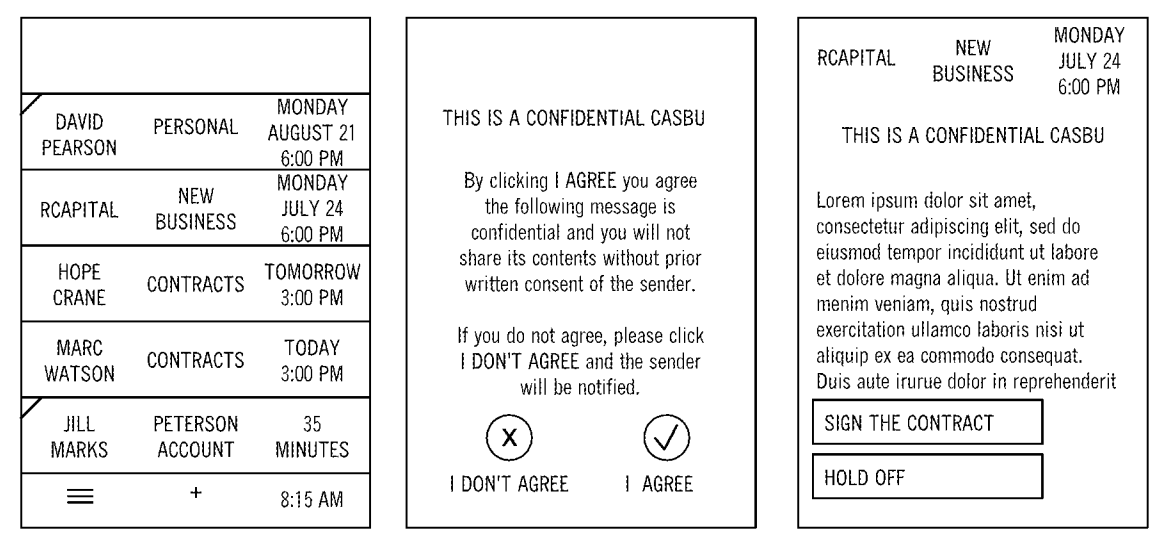

FIG. 6 illustrates an exemplary non-limiting graphical user interface of a confidential CAC in accordance with some embodiments of the present disclosure. In an embodiment, as depicted in the first screen shot of FIG. 6, a participant is presented with the participant's CAC queue as discussed herein. An initiator may have sent the participant a CAC which the initiator marked as confidential through selection of one or more settings in the initiator's setting bar. In an embodiment, the participant may select the confidential CAC from the participant's CAC queue. As is depicted in the second screen shot of FIG. 6, the participant may be presented with a message indicating that the CAC is confidential and requiring agreement to move on to receive the CAC. The participant may be asked to agree to follow confidentiality instructions, and in some embodiments, to agree to requirements of documents such as non-disclosure agreements, along with one or more menus to confirm agreement. The third screen shot of FIG. 6 depicts another exemplary embodiment of options presented to a participant after having received the confidential CAC and agreeing to the confidentiality requirements. In this embodiment, the participant may be presented with options to sign the agreement or to hold off until a later time.

In view of the structures and devices described supra, methods that can be implemented in accordance with the disclosed subject matter will be better appreciated with reference to the flowcharts of FIGS. 7-10. Although steps may be depicted in a particular flow and order, it will be understood that the flow may be modified consistent with the disclosure provided herein, that steps may be removed, and that additional steps may be added consistent with the present disclosure.

Figure 7:
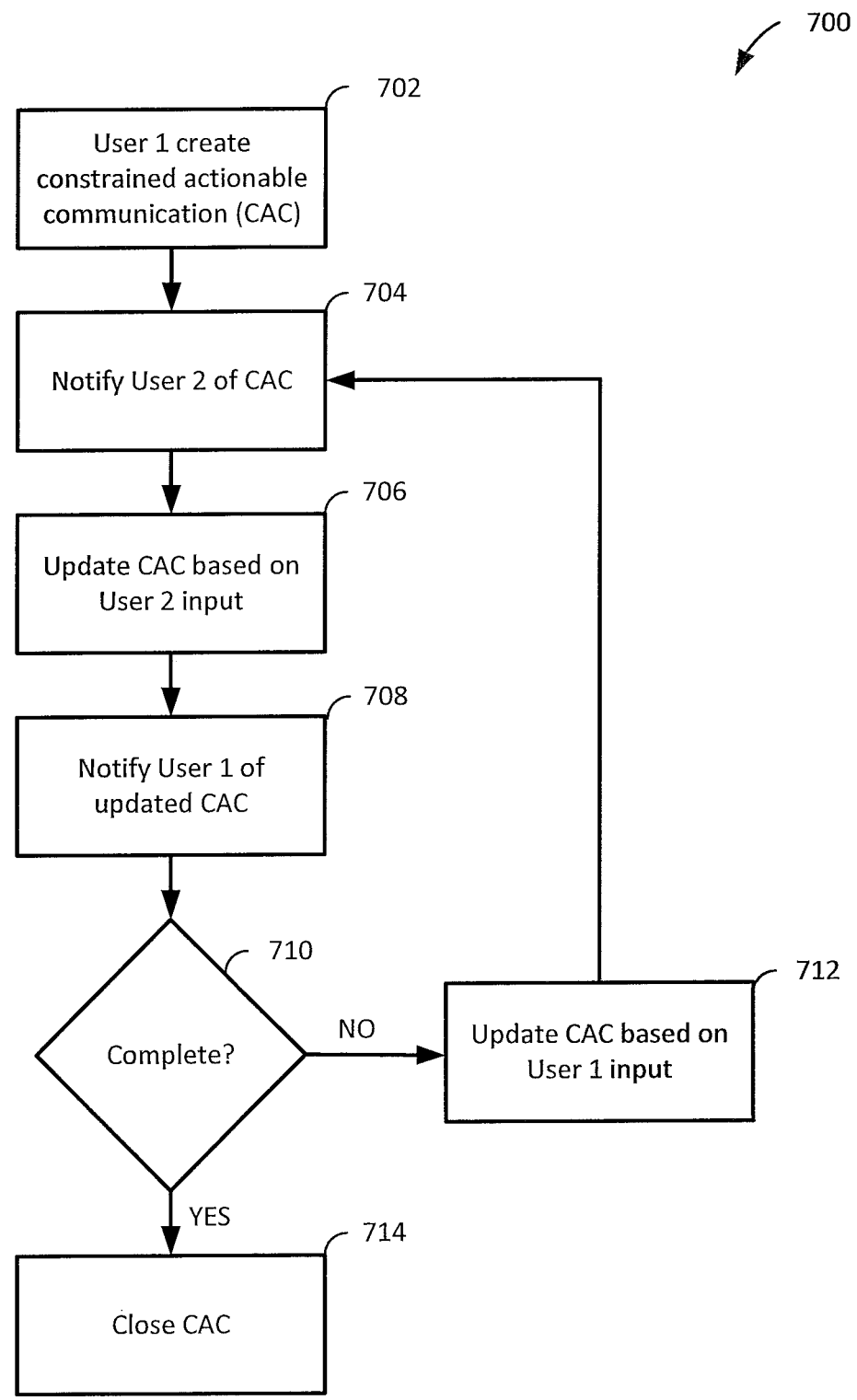
FIG. 7 depicts a non-limiting flow diagram illustrating exemplary methods for processing a CAC.

FIG. 7 depicts an exemplary flowchart corresponding to operation of the constrained communication system 100 of FIG. 1 in accordance with some embodiments of the present disclosure.

At step 702, the CAC server may provide a user interface to user device 106 over network 104 via communication interface 304. User interface 318 of the user device 106 may provide a user interface to a user 1 (e.g., an initiator 220), allowing the user to create a CAC and store the CAC (e.g., at the CAC server 100). Processing may then continue to step 704.

At step 704, a notification may be provided to one or more participants (e.g., from the CAC server to a user device). The user interface 318 of the participant user device may update the CAC cache for the participant based on the newly-initiated CAC. Processing may then continue to step 706.

At step 706, the participant may select the CAC from within the CAC queue such that the participant may provide inputs to the CAC via user interface 318. For example, the participant may be presented with selection options and a query such that the participant may select one of the selections. The result may be communicated (e.g., to the CAC server and/or other user devices) and the CAC may then be updated according to the inputs from the participant. Processing may then continue to step 708.

At step 708, the initiator may be notified of the updated CAC and may access the updated CAC. Processing may then continue to step 710. At step 710, it may be determined that the CAC is complete and processing may continue to step 714. For example, the initiator may receive the responsive selections from the participant, and conclude that the response is satisfactory. The CAC may then be closed and archived, and thus removed from the active queue of the initiator and participants, at step 714.

In some embodiments, the processing of the CAC may not be complete based on one of the participant response or the initiator review of the response. In some embodiments, the query and selections may be configured with nested questions to allow multiple rounds of back and forth. A participant may also respond by adding additional queries or selections to the original queries or selections, or upon receiving the selections, the initiator may create additional selections and/or queries. If the CAC is not complete, processing may continue to step 712 such that the CAC may be updated and the processing of the CAC may continue (e.g., by returning to step 704 to receive participant input).

Figure 8:
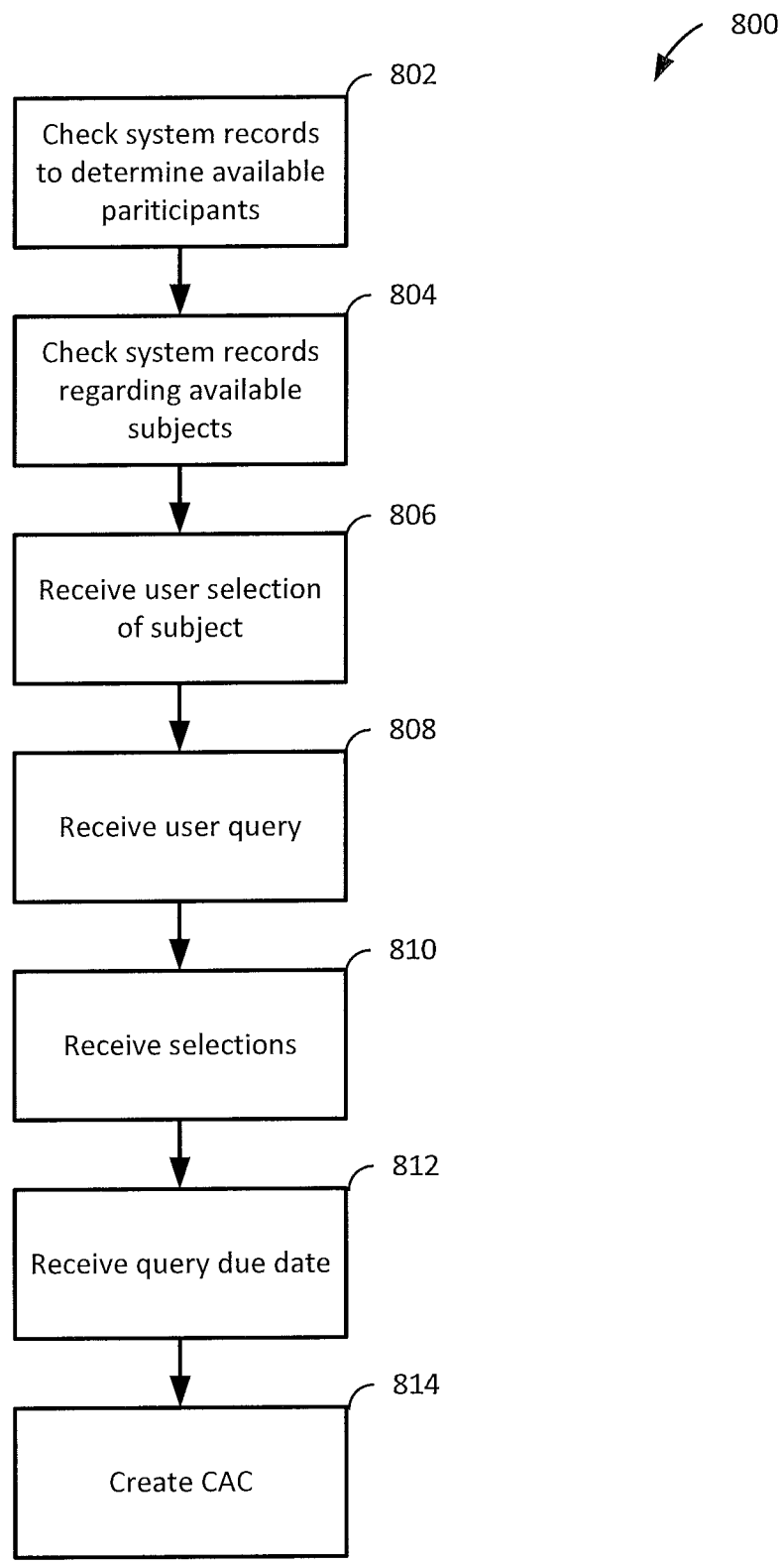
FIG. 8 depicts a non-limiting flow diagram illustrating exemplary methods for creating a CAC.

FIG. 8 depicts an exemplary flowchart 800 corresponding to creating a CAC in accordance with some embodiments of the present disclosure. Although it will be understood that various additional operations such as selections related to priority, confidentiality designations, etc., may be utilized with the steps of FIG. 8, in the exemplary embodiment of FIG. 8 the creation of a particular message having a participant, subject, query, selection, and due date may be provided.

At step 802, system records may be checked (e.g., based on a user choosing to create a CAC) to determine available participants. For example, user instructions 210 may determine participants who are available for communications based on membership in certain groups or previous communications with the initiator. Listings or menus of available users may be provided to the initiator, including with information related to particular users (e.g., groups, initiator priority for the participant, subjects, etc.). The User instructions 210 may allow the user to view a participant list of authorized participants and allow the user select the participant for exchange of CACs. Processing may then continue to step 804.

At step 804, the user may check the system records to determine the subjects made available to the initiator by the participant. In an embodiment, the available subjects may be determined based on settings for the participant, particular subjects that the participant has made available to the particular initiator, particular subjects that are available in groups in which both the initiator and participant are members, or other suitable information regarding subjects. The accessed subjects may be displayed (e.g., with priority and communication option information) and processing may continue to step 806.

At step 806, the initiator may select a subject from the available and displayed subjects. Once a subject is selected, information unique to that subject may be accessed such as particular query formats, available selection types, selection templates, priority selections, and other suitable information related to the particular subject. Processing may then continue to the step 808.

At step 808, the system may receive one or more queries from the initiator, e.g., based on available query formats and inputs for the particular subject, group, and/or user. In some embodiments, the system may confirm whether the query properly relates to the subject. Once the query has been provided for the CAC, processing may continue to step 810.

At step 810, the system may receive one or more selections from the initiator, e.g., based on templates and available selection formats and inputs for the particular subject, group, and/or user. Once the initiator has completed setting the selection options, processing may then continue to step 812.

At step 812, the system may receive information relating to a response due date for the participant to respond to the query and selections from step 808. The due date may be used to prioritize the message along with other priority information, to allow the participant simple access to higher priority CACs. Once the due date has been entered, processing may continue to step 814.

At step 814, the CAC may be created based on the inputs provided at steps 802-812 as well as other inputs that may be provided as described herein. The CAC may be established at the CAC server and/or user devices, and information such as a notification may be provided to the participant (e.g., a notification including information to allow a display within the CAC queue, such that the complete CAC record may be accessed once the display item is accessed). Once the CAC is created the processing of FIG. 8 may end.

Figure 9:
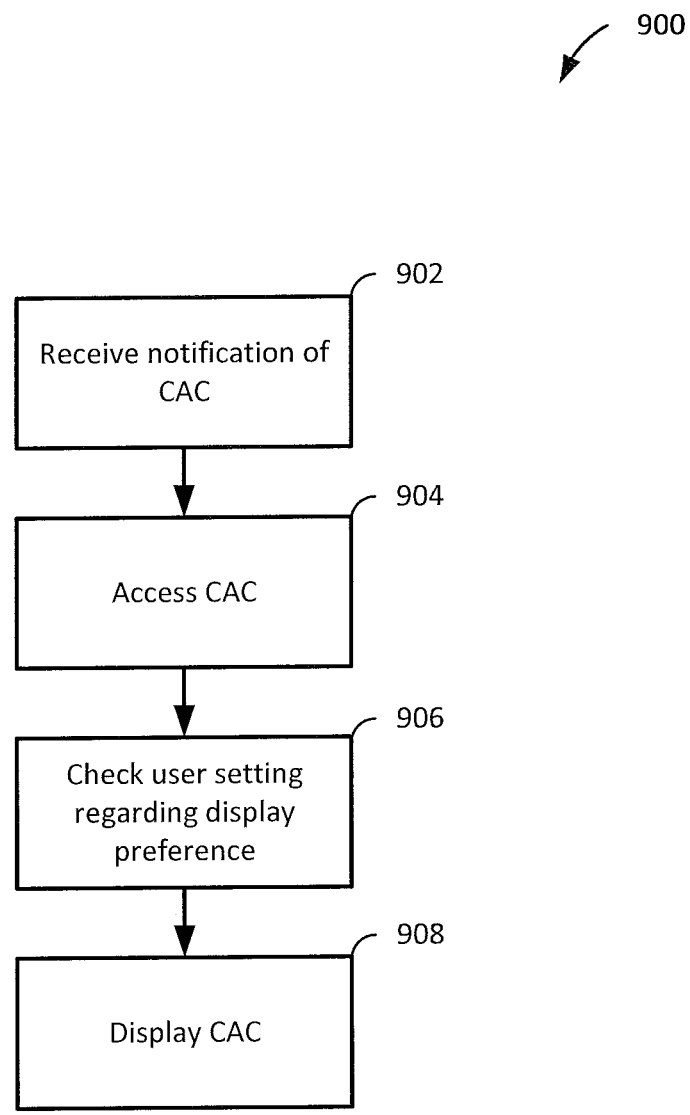
FIG. 9 depicts a non-limiting flow diagram illustrating exemplary methods for displaying a CAC.

FIG. 9 depicts an exemplary flowchart 900 corresponding to displaying a CAC to a participant in accordance with some embodiments of the present disclosure.

At step 902, a participant may receive a notification of new or updated CAC, for example, from the CAC server and/or another user device. The notification may provide information such as the initiator, priority, and an identifier related to the complete underlying CAC. Once the notification has been received, processing may then continue to step 904.

At step 904, the system may access information about the CAC, e.g., based on the received notification and the display status of the participant user device. In different embodiments, only certain aspects of the CAC may be provided to user device initially, wherein selection of the CAC (e.g., from a CAC queue) may result in access to the full CAC information, or to portions of the CAC information as needed to respond to the CAC. In other embodiments, the entire CAC may be provided for storage at the user device, with data from the CAC accessed as necessary to provide information to the user interface of the user device. Once the CAC has been accessed, processing may then continue to step 906.

At step 906, the system may check the user's settings regarding display of the CAC. For example, in an embodiment, the user may prefer to display CACs based upon priority (e.g., CACs with the least priority are displayed at the top). In another embodiment, the user may prefer to display CACs based upon the frequency of interaction with the user who created the CAC (e.g., CACs from a user with more frequent interaction will be displayed first). In an embodiment, as discussed herein, the user may invoke the pause settings and only CACs within a certain priority are displayed. Processing may then continue to step 908, at which information about the CAC (e.g., initiator, due date, priority, queries, selections, etc.) may be displayed based on the participant's progress in completing the CAC. Processing of the steps of FIG. 9 may then end.

Figure 10:
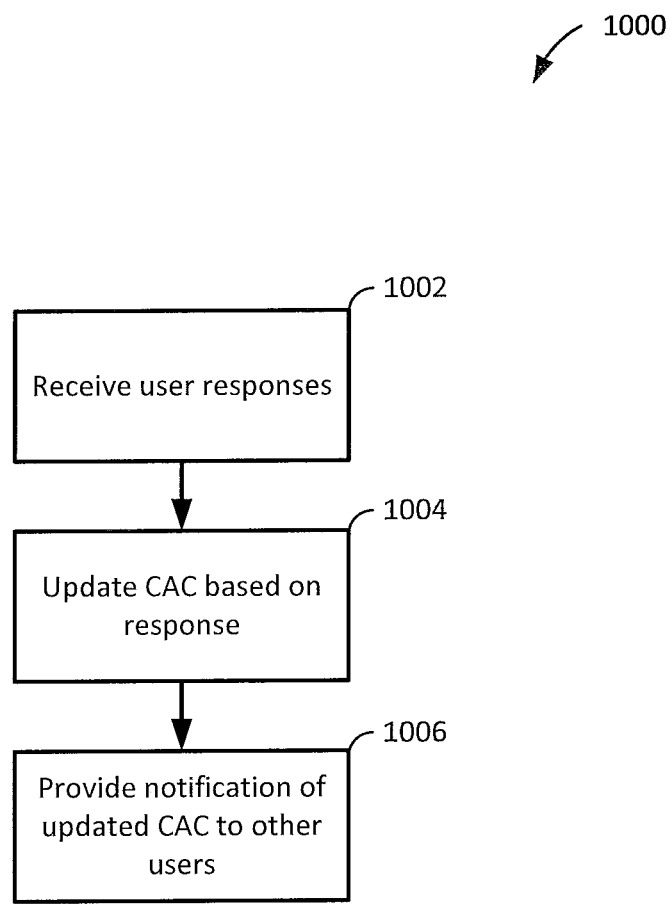
FIG. 10 depicts a non-limiting flow diagram illustrating exemplary methods for receiving and updating a CAC.

FIG. 10 depicts an exemplary flowchart 1000 corresponding to receiving a participant selection and updating a CAC in accordance with some embodiments of the present disclosure.

At step 1002, a user (e.g., a participant 222) selects answers (e.g., selections 232 to one or more queries in a CAC). In an embodiment, as described herein, the user may select an answer provided by the initiator or add a participant-defined answer should the answer options provided by the initiator are not adequate. In another embodiment, the user may add a comment (e.g., an annotation 234) to the answer chosen should the user want to provide more explanation or insight into the chosen answer. Processing may then continue to step 1004.

At step 1004, the CAC is updated according the response received at step 1002. In an embodiment, CAC application instructions 310 may allow the user to communicate with the CAC server 100 and/or other user devices 106 via the communication interface 304 and store the updated CAC in CAC database 212 on the CAC server and/or at user devices 106. Processing may then continue to step 1006.

At step 1006, the initiator of the CAC may receive a notification of the updated CAC. CAC application instructions 310 may provide for a rich display of an interactive interface that facilitates the user receiving notification of the updated CAC from the CAC server 100. In an embodiment, the CAC server may actively notify the user of the updated CAC. Once the initiator is notified of the participant response, the processing of FIG. 10 may then end.

Figure 11B:
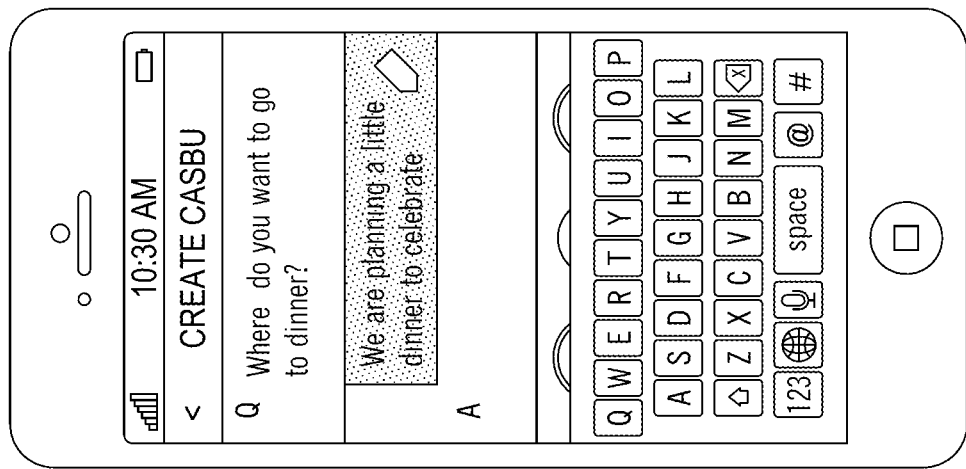
FIGS. 11A-11B show additional exemplary graphical user interfaces in accordance with some embodiments of the present disclosure.
Figure 11A:
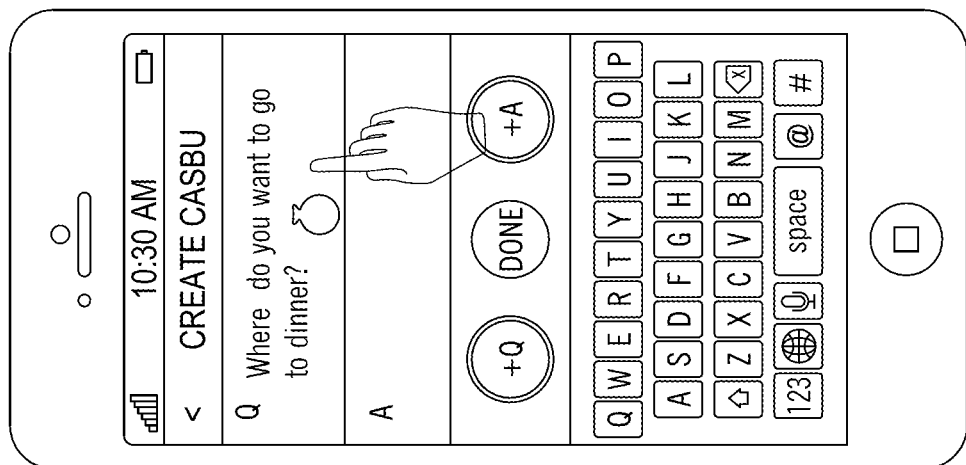

FIGS. 11A-11B illustrate exemplary non-limiting implementations of a constrained communication system graphical user interface in accordance with some embodiments of the present disclosure. As illustrated in FIG. 11A, initiator 220 may type a query 230 related to the previously selected subject 224. In an embodiment, the initiator may press and hold the query, which may open a text field to allow the initiator to type a comment (e.g., an annotation), which may further explain or give further insight into the query 230 (e.g., as depicted in FIG. 11B).

Figure 12B:
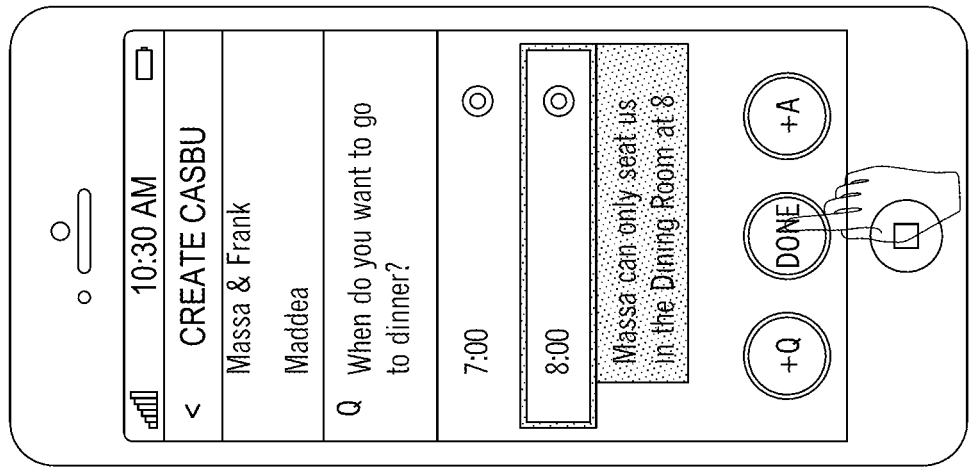
FIGS. 12A-12B show additional exemplary graphical user interfaces in accordance with some embodiments of the present disclosure.
Figure 12A:
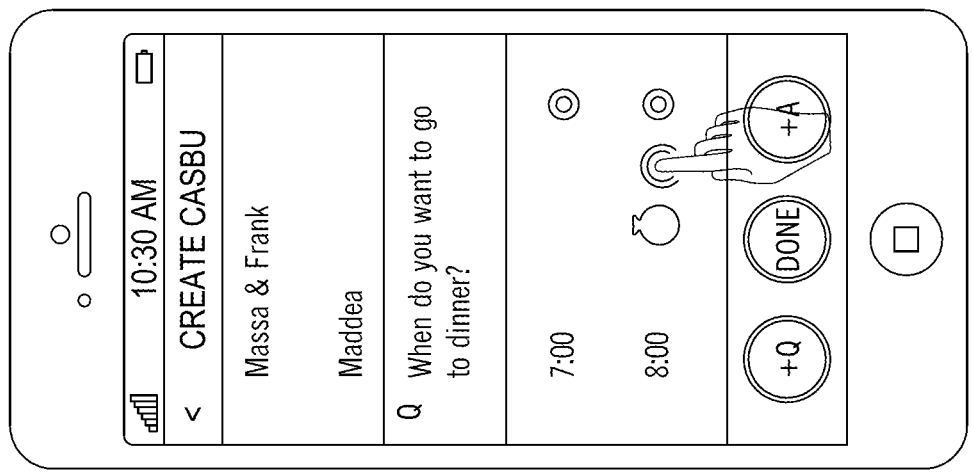

FIGS. 12A-12B illustrate exemplary non-limiting implementations of a constrained communication system graphical user interface in accordance with some embodiments of the present disclosure. As illustrated in FIG. 12A, a participant may add an annotation 234 to one or more of the selections 232 of a query 230 by pressing and holding the particular selection 232 to which the annotation 234 will be added. In an embodiment, as shown in FIG. 12B, a text field may open to allow the participant to add the annotation 234 beneath the selection 232. As described herein, the annotation may comment on the selection or give further insight into why the selection is a choice. For example, as shown in FIG. 12B, the initiator has selected "8:00" as a selection 232 in response to the query 230 (e.g., "When do you want to go to dinner?"). As an annotation to the selection, "8:00", the initiator has added "Musso can only seat us in the Dining Room at 8", which gives further insight into why "8:00" is a selection 232.

FIGS. 13A-E illustrate exemplary non-limiting implementations of a constrained communication system graphical user interface in accordance with the embodiments described herein. In an embodiment, as shown in FIG. 13A, an initiator may select a time for a response for the CAC. As shown in FIG. 13B, priority information 226 may be a time frame from when the CAC was sent (e.g. within an hour, within a day, within a week, within a month, etc.) or a specific date, such as a month, day, and year. In an embodiment, the initiator may tap a time value option to increase the unit (e.g., to increase a 1 week priority by a unit of 1 week to make the priority 2 weeks, 3 weeks, etc.) as shown in FIG. 13B. In an embodiment, as shown in FIG. 13C, the initiator may select a custom time range, which may be a range between a start date and an end date (e.g., as shown in FIG. 13D) or a time range (e.g., as shown in FIG. 13E).

Figure 14B:
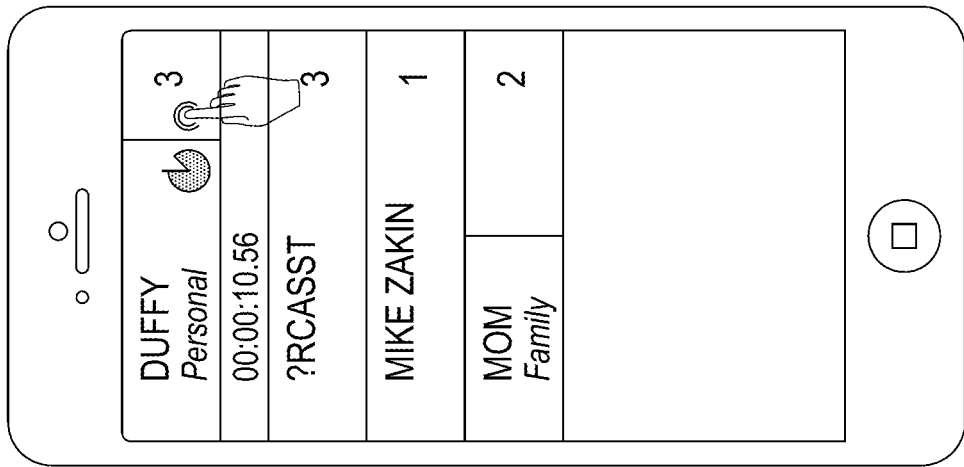
FIGS. 14A-14B show additional exemplary graphical user interfaces in accordance with some embodiments of the present disclosure.
Figure 14A:
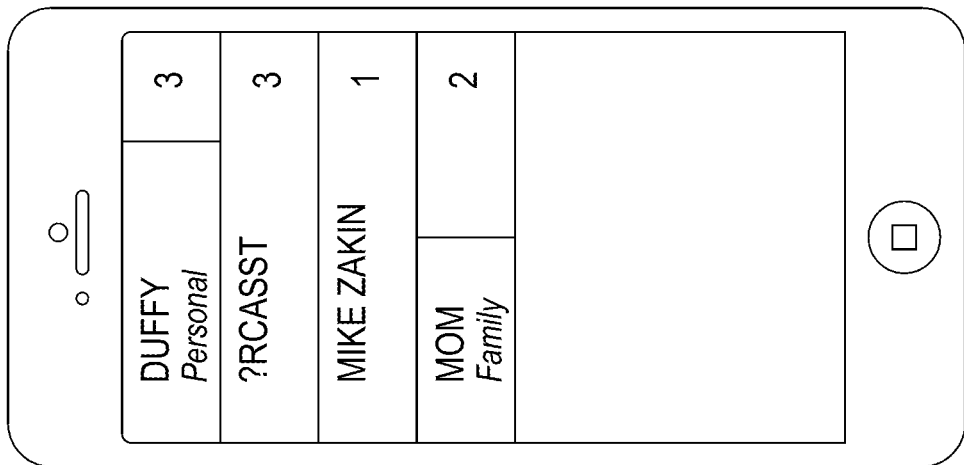

FIGS. 14A-14B illustrate exemplary non-limiting implementations of a constrained communication system graphical user interface in accordance with some embodiments of the present disclosure. In an embodiment, as shown in FIG. 14A, a participant may be presented with a CAC queue, which may provide all outstanding CACs to the participant from a plurality of initiators for which a response is required. In an embodiment, as depicted in FIG. 14A, query indication number may display next to the initiator to indicate the number of queries contained within the CAC. For example, as depicted in FIG. 14A, the initiator, "DUFFY", has sent the participant 3 CACs. In an embodiment, as depicted in FIG. 14B, the participant may tap the query indication number, which may open a drop down menu to display the response time (e.g., the priority information 226) for the CACs. In a similar manner, an initiator may be provided with a similar user interface for all CACs provided to participants.

Figure 15B:
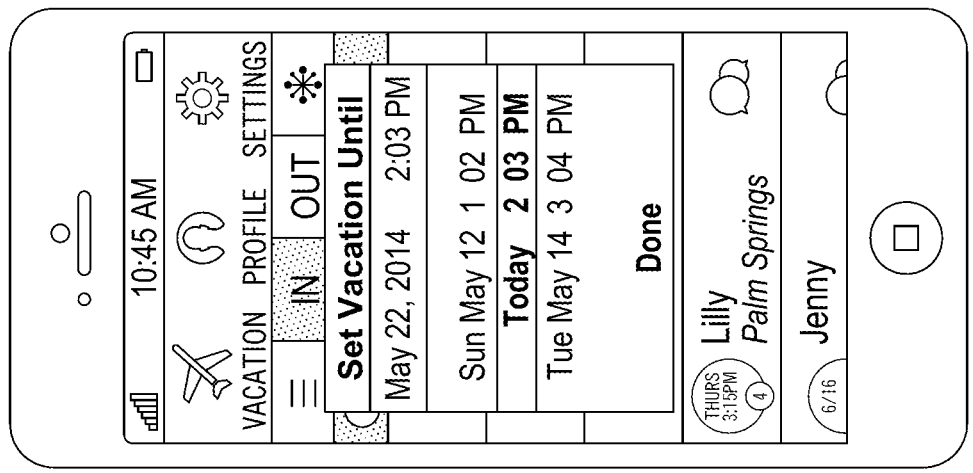
FIGS. 15A-15B show additional exemplary graphical user interfaces in accordance with some embodiments of the present disclosure.
Figure 15A:
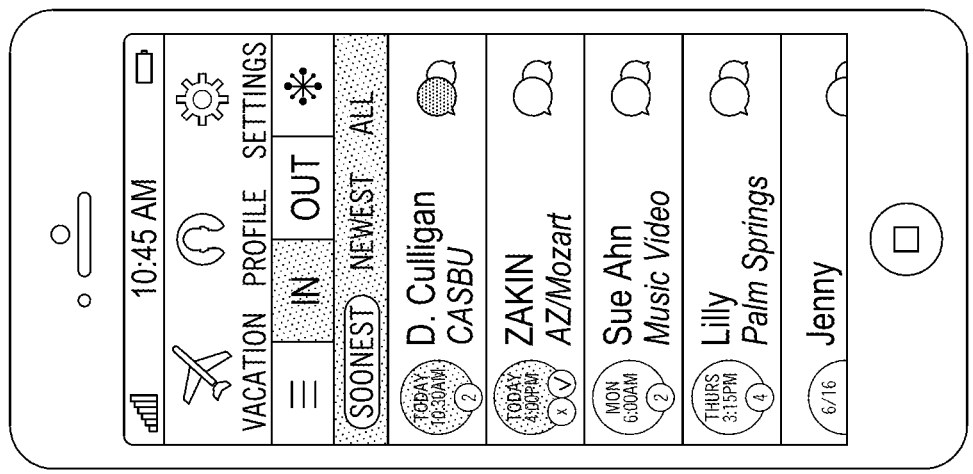

FIGS. 15A-15B illustrate an exemplary non-limiting implementation of a constrained communication system graphical user interface in accordance with some of the embodiments of the present disclosure. In an embodiment, as shown in FIG. 15A, a participant may be presented with a CAC queue, which may provide all outstanding CACs to the participant from a plurality of initiators for which a response is required or (in the OUT selection) all CACs for which the user is an initiator. In an embodiment, the participant may be away or may not want to be disturbed and may enter a vacation by selecting a vacation setting (e.g., as depicted in FIG. 15A). In an embodiment, as depicted in FIG. 15B, the participant may be prompted to enter a time frame (e.g., a specified date) to remain in vacation mode. In an embodiment, the participant will not be notified of a new CAC while in vacation mode. In an embodiment, initiators may be notified that the participant is in vacation mode and will only be provided CACs under predetermined circumstances, e.g., if the initiator confirms that the CAC has a suitably high priority.

FIG. 16 depicts an exemplary persistent data structure for a CAC in accordance with some embodiments of the present disclosure. As discussed herein, the CAC data structure may be based on the available constraints for the particular users, conversations, groups, etc. The CAC data structure may include information about the particular CAC, such as users, subjects, constraints, selection options, text fields, priority information, and other suitable information as described herein. Constraints may include time information such as preferred response time for the CAC, which may be used with other information (e.g., initiator, subject, selection options, queries, groups, participant, etc.) to provide information relating to priority (e.g., a priority rank) for a particular CAC as it is circulated to various participants.

FIG. 17A depicts an exemplary content data structure of the data structure of FIG. 16, such as a JSON (JavaScript Object Notation) data structure in accordance with some embodiments of the present disclosure. In an embodiment, the content data structure may include CAC data information, such as queries 230 and selections 232. As discussed herein, query 230 may include information that is provided such that the participants have additional information related to the subject 224 within that CAC. Query 230 may include information in a variety of formats such as text entries, images, GIFs, video clips, links, e-mails, audio clips, other suitable information, and combinations thereof. Selections 232 may include options for a participant 222 to select initiator 220 defined responses to a query 230 related to a subject 224. In an embodiment, the content data structure may include one or more annotations 234 as discussed herein.

FIG. 17B depicts an exemplary subject data structure (e.g., subject 224) in accordance with some embodiments of the present disclosure. In an embodiment, as discussed herein, subject 224 may be one or more participant-defined subjects (e.g., project A, project B, work, personal, vacation, social, family, etc.) to which a CAC relates (e.g., based on information accessible from a constraint database 218). In an embodiment, the subject data structure may include fields that identify one or more users related to the subject or authorized by a user (e.g. a participant 222) to send CACs related to the subject. In embodiment, the subject data structure may include a field that identifies whether the subject relates to a confidential or private CAC.

FIG. 17C depicts an exemplary user data structure (e.g., an initiator 220 or participant 222) in accordance with some embodiments of the present disclosure. An user data structure may correspond to a user of the CAC system, for example, based on available constraints for the particular users and/or groups associated with the CAC. In an embodiment, as discussed herein, an identifier or similar information may provide a unique reference for the user, and that may be used to access other information related to the user such as available constraints, participants, selection options, priority information, etc. In some embodiments, unique information related to an initiator may be stored and directly accessible via the user data structure.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for communicating within a constrained communication system, comprising:
   determining, based on a credential of a first user, that the first user is authorized to create groupings within the constrained communication system;
   receiving a request to create a group of users for constrained communications;
   accessing, in response to the request, a directory of available users for the group and a set of available constraints for the group;
   receiving a selection of group members for the group from the directory of available users;
   receiving a selection of constraints for the group from the set of available constraints;
   creating the group based on the selected group members and the selected constraints;
   receiving, after the group is created, a request to create a constrained communication for the group;
   generating, in response to the request to create the constrained communication, a persistent constrained data structure for the constrained communication;
   providing for display to each user within the group the constrained communication based on the persistent constrained data structure and one or more inputs provided with the request to create the constrained communication;
   receiving, from each of a plurality of users of the group, a response to the displayed constrained communication;
   updating the persistent constrained data structure based on the responses from each of the plurality of users of the group; and
   providing for display to the users of the group an updated constrained communication based on the updated persistent constrained data structure.

2. The method of claim 1, wherein the credential of the first user comprises a login, a password, or biometric information.

3. The method of claim 1, wherein the directory of available users for the group comprises users affiliated with one another within an organization.

4. The method of claim 1, wherein the selection of group members for the group from the directory of available users comprises applying a hierarchy of constraints to each user within the group based on a user priority previously assigned to each user.

5. The method of claim 1, wherein the persistent constrained data structure comprises a single record of the constrained communication for the group.

6. The method of claim 1, wherein the persistent constrained data structure includes an identifier that uniquely identifies the constrained communication for the group.

7. The method of claim 6, wherein the persistent constrained data structure includes the identifiers for the users within the group, a subject, priority information, a query, and a selection.

8. The method of claim 7, wherein the query comprises a video or an audio clip.

9. The method of claim 7, wherein the selection comprises a plurality of hierarchically nested selections.

10. The method of claim 1, wherein the set of available constraints for the group comprises priority levels associated with users and timing settings.

11. The method of claim 1, wherein the request to create the constrained communication for the group comprises a selection of a template for the constrained communication.

12. The method of claim 1, further comprising providing each user of the group a notification based on user priority information.

13. The method of claim 1, further comprising, prior to receiving the selection of group members, providing a ranked list of users for use in the selection.

14. The method of claim 13, wherein the ranked list of users is based on frequency of interaction with the first user.

15. The method of claim 1, wherein providing for display to the users of the group the constrained communication comprises providing a heat map based on a requested response time to the constrained communication.

16. The method of claim 1, further comprising:
   receiving a confidentiality constraint for the constrained communication;
   requiring, in response to receiving the constrained communication, a user acknowledgement from each user prior to providing the constrained communication for display; and
   storing the user acknowledgements in the persistent constrained data structure.

17. The method of claim 1, further comprising providing, for display to the first user, the updated constrained communication, wherein the display provided to the first user comprises an ordered listing of the responses from each of the plurality of users of the group.

18. The method of claim 1, wherein the display provided to the first user comprises a heat map of the ordered listing.

19. A non-transitory computer-readable storage medium comprising instructions stored thereon, which when executed by one or more processors, cause the one or more processors to perform operations comprising:
  determining, based on a credential of a first user, that the first user is authorized to create groupings within the constrained communication system;
  receiving a request to create a group of users for constrained communications;
  accessing, in response to the request, a directory of available users for the group and a set of available constraints for the group;
  receiving a selection of group members for the group from the directory of available users;
  receiving a selection of constraints for the group from the set of available constraints;
  creating the group based on the selected group members and the selected constraints;
  receiving, after the group is created, a request to create a constrained communication for the group;
  generating, in response to the request to create the constrained communication, a persistent constrained data structure for the constrained communication;
  providing for display to each user within the group the constrained communication based on the persistent constrained data structure and one or more inputs provided with the request to create the constrained communication;
  receiving, from each of a plurality of users of the group, a response to the displayed constrained communication;
  updating the persistent constrained data structure based on the responses from each of the plurality of users of the group; and
  providing for display to the users of the group an updated constrained communication based on the updated persistent constrained data structure.

20. A system for communicating within a constrained communication system, comprising:
  at least one memory having instructions stored thereon; and
  at least one processor coupled to the memory, the processor configured to execute the instructions to:
    determine, based on a credential of a first user, that the first user is authorized to create groupings within the constrained communication system;
    receive a request to create a group of users for constrained communications;
    access, in response to the request, a directory of available users for the group and a set of available constraints for the group;
    receive a selection of group members for the group from the directory of available users;
    receive a selection of constraints for the group from the set of available constraints;
    create the group based on the selected group members and the selected constraints;
    receive, after the group is created, a request to create a constrained communication for the group;
    generate, in response to the request to create the constrained communication, a persistent constrained data structure for the constrained communication;
    provide for display to each user within the group the constrained communication based on the persistent constrained data structure and one or more inputs provided with the request to create the constrained communication;
    receive, from each of a plurality of users of the group, a response to the displayed constrained communication;
    update the persistent constrained data structure based on the responses from each of the plurality of users of the group; and
    provide for display to the users of the group an updated constrained communication based on the updated persistent constrained data structure.

* * * * *

UNITED STATES PATENT AND TRADEMARK OFFICE
CERTIFICATE OF CORRECTION

PATENT NO. : 11,733,852 B2
APPLICATION NO. : 17/869397
DATED : August 22, 2023
INVENTOR(S) : Roman F. Coppola It is certified that error appears in the above-identified patent and that said Letters Patent is hereby corrected as shown below:

On the Title Page

In Column 1, item (73), under Assignee, Line 1, delete "Casbu LLC," and insert -- Casbu, LLC, --, therefor.

Signed and Sealed this
Twenty-sixth Day of September, 2023

Katherine Kelly Vidal
*Director of the United States Patent and Trademark Office*